United States Patent
Wedig et al.

(10) Patent No.: US 11,995,976 B2
(45) Date of Patent: May 28, 2024

(54) OWNER CONTROLLED EVACUATION SYSTEM

(71) Applicant: OneEvent Technologies, Inc., Mount Horeb, WI (US)

(72) Inventors: Kurt J. Wedig, Mount Horeb, WI (US); Daniel Ralph Parent, Mount Horeb, WI (US)

(73) Assignee: OneEvent Technologies, Inc., Mount Horeb, WI (US)

( * ) Notice: Subject to any disclaimer, the term of this patent is extended or adjusted under 35 U.S.C. 154(b) by 0 days.

(21) Appl. No.: 17/712,181

(22) Filed: Apr. 3, 2022

(65) Prior Publication Data

US 2022/0230528 A1 Jul. 21, 2022

Related U.S. Application Data

(63) Continuation of application No. 16/876,381, filed on May 18, 2020, now abandoned, which is a
(Continued)

(51) Int. Cl.
*G08B 25/01* (2006.01)
*G01C 21/20* (2006.01)
(Continued)

(52) U.S. Cl.
CPC ......... *G08B 25/016* (2013.01); *G01C 21/206* (2013.01); *G08B 7/066* (2013.01); *G08B 17/10* (2013.01); *G08B 25/10* (2013.01)

(58) Field of Classification Search
CPC ....... G01C 21/206; G01J 5/041; G05B 15/02; G06F 16/951; G06N 7/005; G06Q 10/083; G06Q 40/08; G08B 7/066; G08B 17/00; G08B 17/10; G08B 19/005; G08B 21/182; G08B 25/006; G08B 25/009; G08B 25/016; G08B 25/085; G08B 25/10; H04L 67/12; H04W 4/02; H04W 4/021; H04W 4/90; H04W 52/0216
(Continued)

(56) References Cited

U.S. PATENT DOCUMENTS

2009/0115621 A1* 5/2009 Nguyen ................. G06Q 30/00
340/686.1
2010/0056886 A1* 3/2010 Hurtubise ............ A61B 5/6838
600/324
(Continued)

*Primary Examiner* — Stephen R Burgdorf
(74) *Attorney, Agent, or Firm* — Kenneth A. Smith

(57) ABSTRACT

A method includes receiving, by a user device, information regarding a sensed condition in a structure. The sensed condition is sensed by a sensory node. The method also includes providing, by the user device, a notification identifying the sensed condition to a user of the user device, and receiving, by the user device, information regarding navigable pathways of the structure. The method further includes determining, by the user device, a location of the user device, and identifying, by the user device, a first evacuation route based at least in part on the information regarding the sensed condition, the information regarding navigable pathways of the structure, and the location of the user device. The method also includes displaying, by the user device, the first evacuation route.

16 Claims, 7 Drawing Sheets

Related U.S. Application Data continuation of application No. 15/787,917, filed on Oct. 19, 2017, now Pat. No. 10,657,797, which is a continuation of application No. 14/587,358, filed on Dec. 31, 2014, now Pat. No. 9,799,205, which is a continuation-in-part of application No. 14/330,508, filed on Jul. 14, 2014, now abandoned.

(60) Provisional application No. 61/846,371, filed on Jul. 15, 2013.

(51) Int. Cl.
*G08B 7/06* (2006.01)
*G08B 17/10* (2006.01)
*G08B 25/10* (2006.01)

(58) Field of Classification Search
USPC .......................................... 340/501
See application file for complete search history.

(56) References Cited

U.S. PATENT DOCUMENTS

| | | | | |
|---|---|---|---|---|
| 2010/0198374 A1* | 8/2010 | Carson | ................... | G06Q 10/00 340/6.1 |
| 2011/0136463 A1* | 6/2011 | Ebdon | .................. | G01C 21/206 455/404.1 |
| 2011/0195687 A1* | 8/2011 | Das | ....................... | H04W 4/024 455/404.1 |
| 2011/0241877 A1* | 10/2011 | Wedig | ................... | G08B 17/00 340/540 |
| 2012/0173137 A1* | 7/2012 | Compton | ............. | G01C 21/206 701/423 |
| 2014/0320282 A1* | 10/2014 | Zhang | ................... | G08B 7/066 340/502 |
| 2019/0110159 A1* | 4/2019 | Grube | .................. | H04W 8/183 |

* cited by examiner

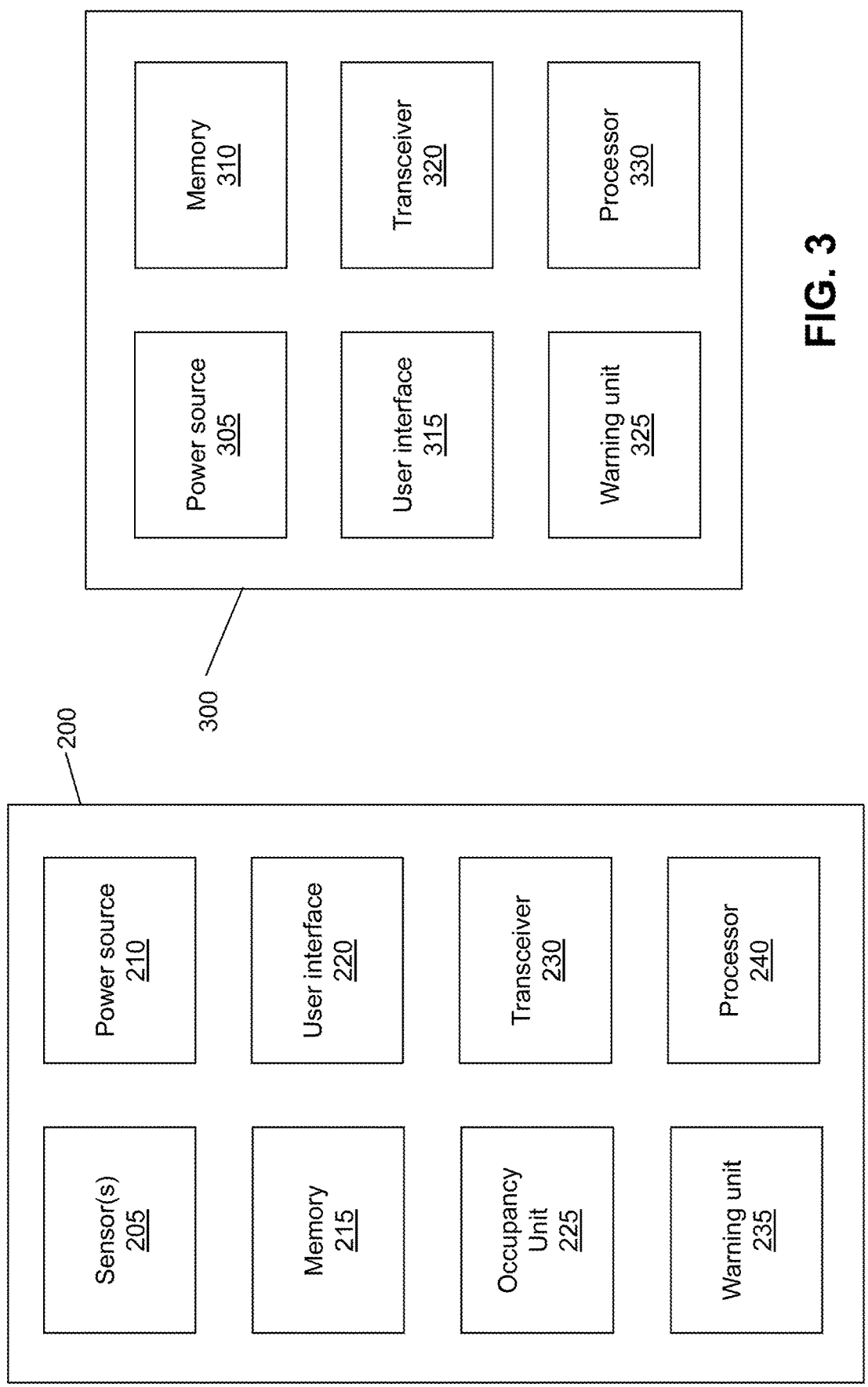

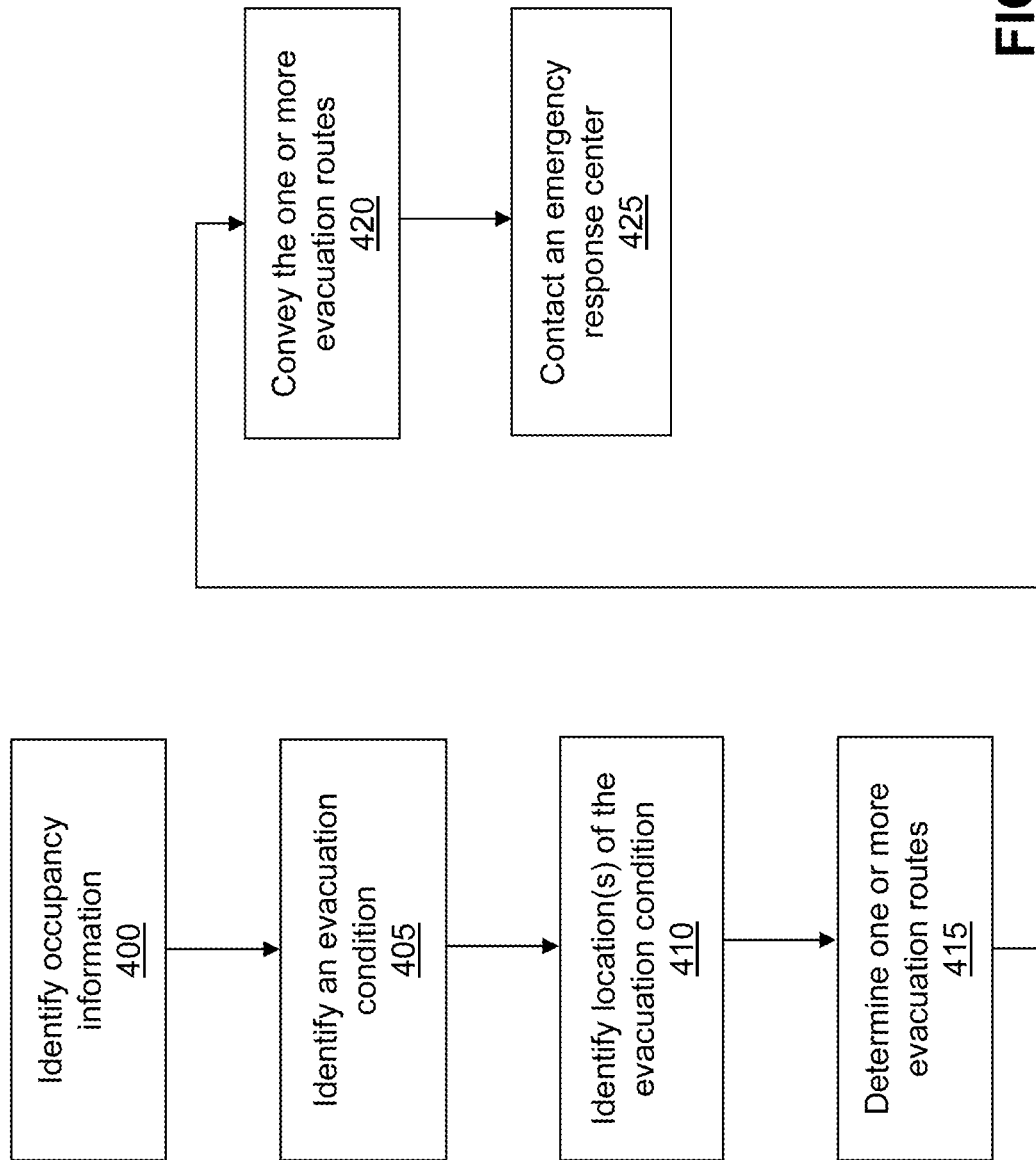

OWNER CONTROLLED EVACUATION SYSTEM

CROSS-REFERENCE TO RELATED APPLICATIONS

The present application is a continuation of U.S. patent application Ser. No. 16/876,381, filed May 18, 2020, which is a continuation of U.S. patent application Ser. No. 15/787,917 (now U.S. Pat. No. 10,657,797), filed Oct. 19, 2017, which is a continuation of U.S. patent application Ser. No. 14/587,358 (now U.S. Pat. No. 9,799,205), filed on Dec. 31, 2014, which is a continuation-in-part of U.S. non-Provisional Application Ser. No. 14/330,508 filed on Jul. 14, 2014, which in turn claims priority from U.S. Provisional Application No. 61/846,371 filed on Jul. 15, 2013, the entireties of which are incorporated by reference herein.

BACKGROUND

Most homes, office buildings, stores, etc. are equipped with one or more smoke detectors. In the event of a fire, the smoke detectors are configured to detect smoke and sound an alarm. The alarm, which is generally a series of loud beeps or buzzes, is intended to alert individuals of the fire such that the individuals can evacuate the building. Unfortunately, with the use of smoke detectors, there are still many casualties every year caused by building fires and other hazardous conditions. Confusion in the face of an emergency, poor visibility, unfamiliarity with the building, etc. can all contribute to the inability of individuals to effectively evacuate a building. Further, in a smoke detector equipped building with multiple exits, individuals have no way of knowing which exit is safest in the event of a fire or other evacuation condition. As such, the inventors have perceived an intelligent evacuation system to help individuals successfully evacuate a building in the event of an evacuation condition.

SUMMARY

An illustrative method includes receiving occupancy information from a node located in an area of a structure, where the occupancy information includes a number of individuals located in the area. An indication of an evacuation condition is received from the node. One or more evacuation routes are determined based at least in part on the occupancy information. An instruction is provided to the node to convey at least one of the one or more evacuation routes.

An illustrative node includes a transceiver and a processor operatively coupled to the transceiver. The transceiver is configured to receive occupancy information from a second node located in an area of a structure. The transceiver is also configured to receive an indication of an evacuation condition from the second node. The processor is configured to determine an evacuation route based at least in part on the occupancy information. The processor is further configured to cause the transceiver to provide an instruction to the second node to convey the evacuation route.

An illustrative system includes a first node and a second node. The first node includes a first processor, a first sensor operatively coupled to the first processor, a first occupancy unit operatively coupled to the first processor, a first transceiver operatively coupled to the first processor, and a first warning unit operatively coupled to the processor. The first sensor is configured to detect an evacuation condition. The first occupancy unit is configured to determine occupancy information. The first transceiver is configured to transmit an indication of the evacuation condition and the occupancy information to the second node. The second node includes a second transceiver and a second processor operatively coupled to the second transceiver. The second transceiver is configured to receive the indication of the evacuation condition and the occupancy information from the first node. The second processor is configured to determine one or more evacuation routes based at least in part on the occupancy information. The second processor is also configured to cause the second transceiver to provide an instruction to the first node to convey at least one of the one or more evacuation routes through the first warning unit.

Another illustrative method includes receiving, with a portable occupancy unit, a first signal using a first detector, where the first signal is indicative of an occupant in a structure. A second signal is received with the portable occupancy unit using a second detector. The second signal is indicative of the occupant in the structure. The first signal and the second signal are processed to determine whether the occupant is present in the structure. If it is determined that the occupant is present in the structure, an output is provided to convey that the occupant has been detected.

An illustrative portable occupancy unit includes a first detector, a second detector, a processor, and an output interface. The first detector is configured to detect a first signal, where the first signal is indicative of an occupant in a structure. The second detector is configured to detect a second signal, where the second signal is indicative of the occupant in the structure. The processor is configured to process the first signal and the second signal to determine whether the occupant is present in the structure. The output interface is configured to convey an output if the occupant is present in the structure.

An illustrative tangible computer-readable medium having computer-readable instructions stored thereon is also provided. If executed by a portable occupancy unit, the computer-executable instructions cause the portable occupancy unit to perform a method. The method includes receiving a first signal using a first detector, where the first signal is indicative of an occupant in a structure. A second signal is received using a second detector, where the second signal is indicative of the occupant in the structure. The first signal and the second signal are processed to determine whether the occupant is present in the structure. If it is determined that the occupant is present in the structure, an output is provided to convey that the occupant has been detected.

An illustrative method includes receiving, at a server, an indication of an evacuation condition from a sensory node located in a structure. The method also includes determining a severity of the evacuation condition. The method further includes adjusting a sensitivity of at least one sensory node in the structure based at least part on the severity of the evacuation condition.

An illustrative system server includes a memory configured to store an indication of an evacuation condition that is received from a sensory node located in a structure. The system server also includes a processor operatively coupled to the memory. The processor is configured to determine a severity of the evacuation condition. The processor is also configured to adjust a sensitivity of at least one sensory node in the structure based at least part on the severity of the evacuation condition.

An illustrative non-transitory computer-readable medium has computer-readable instructions stored thereon. The computer-readable instructions include instructions to store an indication of an evacuation condition that is received from a sensory node located in a structure. The computer-readable instructions also include instructions to determine a severity of the evacuation condition. The computer-readable instructions further include instructions to adjust a sensitivity of at least one sensory node in the structure based at least part on the severity of the evacuation condition.

An illustrative method includes receiving, at a computing device, an identification code of a sensory node configured to sense at least one characteristic of an environment. The method further includes determining location information of the sensory node. The method further includes transmitting the identification code and the location information from the computing device to a server. The sensory node and the server can be part of a monitoring system configured to monitor at least one characteristic of an area comprising the environment.

An illustrative method includes receiving, at a computing device from a sensory node, an indication of an evacuation condition. The method further includes determining, by the computing device, a severity of the evacuation condition. The method further includes transmitting data related to the evacuation condition from the computing device to an emergency responder via a wireless telecommunications network.

An illustrative method includes receiving, at a computing device from a sensory node, an indication of a condition and determining, by the computing device, a severity of the condition. The method further includes transmitting, by the computing device, data related to the condition to a user device. The data can include the indication of the condition and the severity of the condition.

An illustrative system includes a sensory node configured to transmit data to a user device via a low energy wireless communication network in response to the user device being within a communication range. The data can include information related to a sensed condition. The sensory node can be further configured to store the data if the user device is not within the communication range. The system further includes the user device configured to transmit the data to a server via a telecommunications network and a server configured to store the data.

A method includes receiving, by a user device, information regarding a sensed condition in a structure, wherein the sensed condition is sensed by a sensory node. The method also includes generating, by the user device, a notification to a user of the user device, where the notification identifies the sensed condition. The method also includes determining, by the user device, whether the sensed condition exceeds a threshold. The method further includes identifying one or more actions that can be performed by the user in response to the sensed condition, where the one or more actions are based at least in part on the determining of whether the sensed condition exceeds the threshold.

A system includes a sensory node and a user device. The sensory node is configured to transmit data to a user device via a wireless communication network in response to the user device being within a communication range of the sensory node. The data comprises information related to a sensed condition. The sensory nodes is also configured to store the data if the user device is not within the communication range. The user device is configured to generate a notification to a user of the user device, where the notification identifies the sensed condition. The user device is also configured to determine whether the sensed condition exceeds a threshold and identify one or more actions that can be performed by the user in response to the sensed condition. The one or more actions are based at least in part on the determination of whether the sensed condition exceeds the threshold.

A method includes receiving, by a user device, information regarding a sensed condition in a structure. The sensed condition is sensed by a sensory node. The method also includes providing, by the user device, a notification identifying the sensed condition to a user of the user device, and receiving, by the user device, information regarding navigable pathways of the structure. The method further includes determining, by the user device, a location of the user device, and identifying, by the user device, a first evacuation route based at least in part on the information regarding the sensed condition, the information regarding navigable pathways of the structure, and the location of the user device. The method also includes displaying, by the user device, the first evacuation route.

A mobile device includes a memory and a processor operatively coupled to the memory. The processor is configured to receive information regarding a sensed condition in a structure, wherein the sensed condition is sensed by a sensory node, and provide a notification identifying the sensed condition to a user of the user device. The processor is further configured to receive information regarding navigable pathways of the structure, determine a location of the user device, identify a first evacuation route based at least in part on the information regarding the sensed condition, the information regarding navigable pathways of the structure, and the location of the user device, and display the first evacuation route.

A system includes a sensory node that comprises a sensory node memory and a sensory node processor that is operatively coupled to the sensory node memory. The sensory node processor is configured to transmit, to a user device, data comprising information identifying a sensed condition, and transmit, to the user device, data comprising navigable pathways of a structure. The system can also include the user device that includes a user device memory and a user device processor operatively coupled to the user device memory. The user device processor is configured to provide a notification identifying the sensed condition to a user of the user device and determine a location of the user device. The user device processor is further configured to identify a first evacuation route, wherein the first evacuation route is based at least in part on the information identifying the sensed condition, the information regarding navigable pathways of the structure, and the location of the user device, and display, on a user device display, the first evacuation route.

Other principal features and advantages will become apparent to those skilled in the art upon review of the following drawings, the detailed description, and the appended claims.

BRIEF DESCRIPTION OF THE DRAWINGS

Illustrative embodiments will hereafter be described with reference to the accompanying drawings.

FIG. 2 is a block diagram illustrating a sensory node in accordance with an illustrative embodiment.

FIG. 3 is a block diagram illustrating a decision node in accordance with an illustrative embodiment.

FIG. 4 is a flow diagram illustrating operations performed by an evacuation system in accordance with an illustrative embodiment.

DETAILED DESCRIPTION

Described herein are illustrative evacuation systems for use in assisting individuals with evacuation from a structure during an evacuation condition. An illustrative evacuation system can include one or more sensory nodes configured to detect and/or monitor occupancy and to detect the evacuation condition. Based on the type of evacuation condition, the magnitude (or severity) of the evacuation condition, the location of the sensory node which detected the evacuation condition, the occupancy information, and/or other factors, the evacuation system can determine one or more evacuation routes such that individuals are able to safely evacuate the structure. The one or more evacuation routes can be conveyed to the individuals in the structure through one or more spoken audible evacuation messages. The evacuation system can also contact an emergency response center in response to the evacuation condition.

Figure 1:
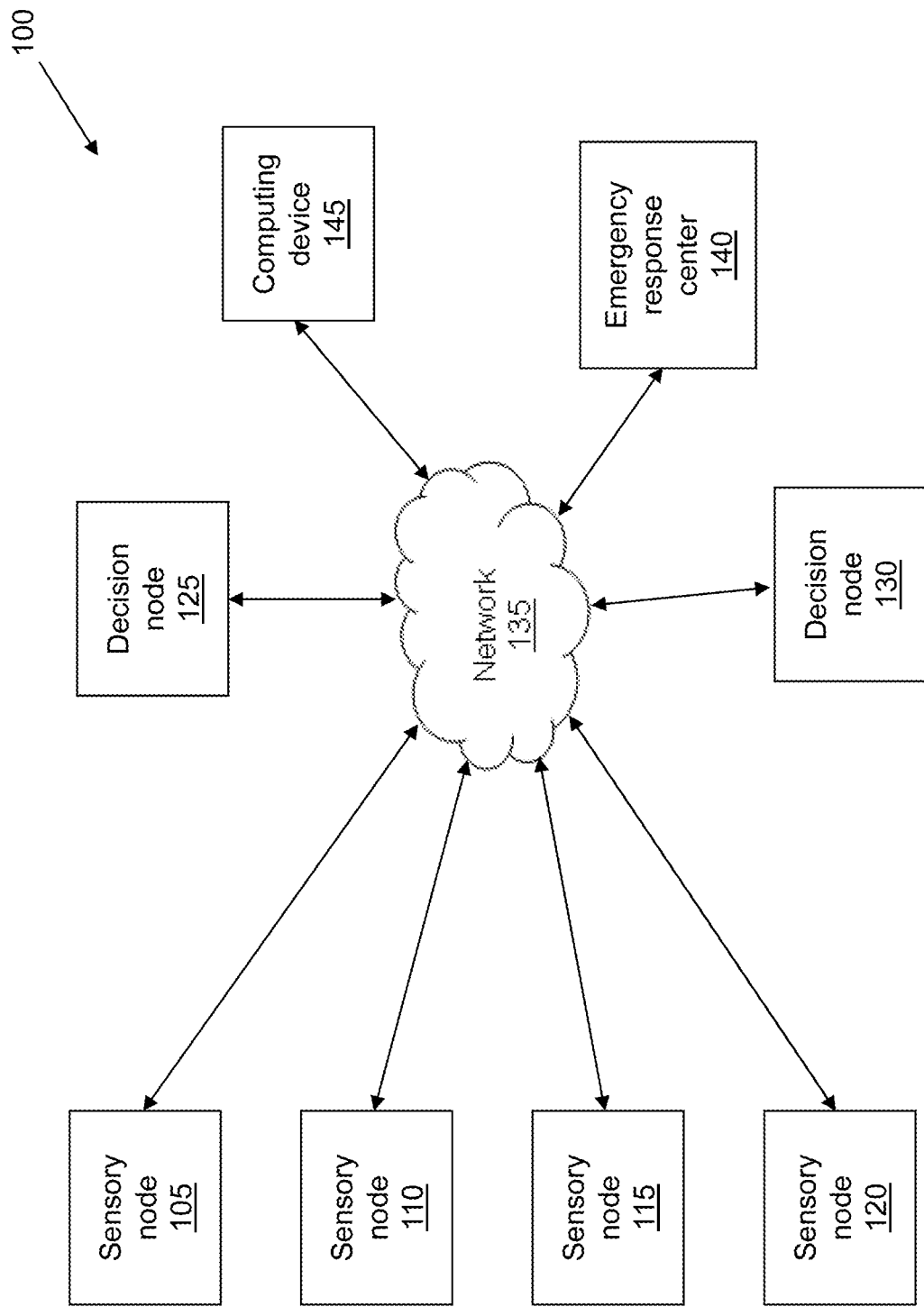
FIG. 1 is a block diagram illustrating an evacuation system in accordance with an illustrative embodiment.

FIG. 1 is a block diagram of an evacuation system 100 in accordance with an illustrative embodiment. In alternative embodiments, evacuation system 100 may include additional, fewer, and/or different components. Evacuation system 100 includes a sensory node 105, a sensory node 110, a sensory node 115, and a sensory node 120. In alternative embodiments, additional or fewer sensory nodes may be included. Evacuation system 100 also includes a decision node 125 and a decision node 130. Alternatively, additional or fewer decision nodes may be included.

In an illustrative embodiment, sensory nodes 105, 110, 115, and 120 can be configured to detect an evacuation condition. The evacuation condition can be a fire, which may be detected by the presence of smoke and/or excessive heat. The evacuation condition may also be an unacceptable level of a toxic gas such as carbon monoxide, nitrogen dioxide, etc. Sensory nodes 105, 110, 115, and 120 can be distributed throughout a structure. The structure can be a home, an office building, a commercial space, a store, a factory, or any other building or structure. As an example, a single story office building can have one or more sensory nodes in each office, each bathroom, each common area, etc. An illustrative sensory node is described in more detail with reference to FIG. 2.

Sensory nodes 105, 110, 115, and 120 can also be configured to detect and/or monitor occupancy such that evacuation system 100 can determine one or more optimal evacuation routes. For example, sensory node 105 may be placed in a conference room of a hotel. Using occupancy detection, sensory node 105 can know that there are approximately 80 individuals in the conference room at the time of an evacuation condition. Evacuation system 100 can use this occupancy information (i.e., the number of individuals and/or the location of the individuals) to determine the evacuation route(s). For example, evacuation system 100 may attempt to determine at least two safe evacuation routes from the conference room to avoid congestion that may occur if only a single evacuation route is designated. Occupancy detection and monitoring are described in more detail with reference to FIG. 2.

Decision nodes 125 and 130 can be configured to determine one or more evacuation routes upon detection of an evacuation condition. Decision nodes 125 and 130 can determine the one or more evacuation routes based on occupancy information such as a present occupancy or an occupancy pattern of a given area, the type of evacuation condition, the magnitude of the evacuation condition, the location(s) at which the evacuation condition is detected, the layout of the structure, etc. The occupancy pattern can be learned over time as the nodes monitor areas during quiescent conditions. Upon determination of the one or more evacuation routes, decision nodes 125 and 130 and/or sensory nodes 105, 110, 115, and 120 can convey the evacuation route(s) to the individuals in the structure. In an illustrative embodiment, the evacuation route(s) can be conveyed as audible voice evacuation messages through speakers of decision nodes 125 and 130 and/or sensory nodes 105, 110, 115, and 120. Alternatively, the evacuation route(s) can be conveyed by any other method. An illustrative decision node is described in more detail with reference to FIG. 3.

Sensory nodes 105, 110, 115, and 120 can communicate with decision nodes 125 and 130 through a network 135. Network 135 can include a short-range communication network such as a Bluetooth network, a Zigbee network, etc. Network 135 can also include a local area network (LAN), a wide area network (WAN), a telecommunications network, the Internet, a public switched telephone network (PSTN), and/or any other type of communication network known to those of skill in the art. Network 135 can be a distributed intelligent network such that evacuation system 100 can make decisions based on sensory input from any nodes in the population of nodes. In an illustrative embodiment, decision nodes 125 and 130 can communicate with sensory nodes 105, 110, 115, and 120 through a short-range communication network. Decision nodes 125 and 130 can also communicate with an emergency response center 140 through a telecommunications network, the Internet, a PSTN, etc. As such, in the event of an evacuation condition, emergency response center 140 can be automatically notified. Emergency response center 140 can be a 911 call center, a fire department, a police department, etc.

In the event of an evacuation condition, a sensory node that detected the evacuation condition can provide an indication of the evacuation condition to decision node 125 and/or decision node 130. The indication can include an identification and/or location of the sensory node, a type of the evacuation condition, and/or a magnitude of the evacuation condition. The magnitude of the evacuation condition can include an amount of smoke generated by a fire, an amount of heat generated by a fire, an amount of toxic gas in the air, etc. The indication of the evacuation condition can be used by decision node 125 and/or decision node 130 to determine evacuation routes. Determination of an evacuation route is described in more detail with reference to FIG. 4.

In an illustrative embodiment, sensory nodes 105, 110, 115, and 120 can also periodically provide status information to decision node 125 and/or decision node 130. The status information can include an identification of the sensory node, location information corresponding to the sensory node, information regarding battery life, and/or information regarding whether the sensory node is functioning properly. As such, decision nodes 125 and 130 can be used as a diagnostic tool to alert a system administrator or other user of any problems with sensory nodes 105, 110, 115, and 120. Decision nodes 125 and 130 can also communicate status information to one another for diagnostic purposes. The system administrator can also be alerted if any of the nodes of evacuation system 100 fail to timely provide status information according to a periodic schedule. In one embodiment, a detected failure or problem within evacuation system 100 can be communicated to the system administrator or other user via a text message or an e-mail.

In one embodiment, network 135 can include a redundant (or self-healing) mesh network centered around sensory nodes 105, 110, 115, and 120 and decision nodes 125 and 130. As such, sensory nodes 105, 110, 115, and 120 can communicate directly with decision nodes 125 and 130, or indirectly through other sensory nodes. As an example, sensory node 105 can provide status information directly to decision node 125. Alternatively, sensory node 105 can provide the status information to sensory node 115, sensory node 115 can provide the status information (relative to sensory node 105) to sensory node 120, and sensory node 120 can provide the status information (relative to sensory node 105) to decision node 125. The redundant mesh network can be dynamic such that communication routes can be determined on the fly in the event of a malfunctioning node. As such, in the example above, if sensory node 120 is down, sensory node 115 can automatically provide the status information (relative to sensory node 105) directly to decision node 125 or to sensory node 110 for provision to decision node 125. Similarly, if decision node 125 is down, sensory nodes 105, 110, 115, and 120 can be configured to convey status information directly or indirectly to decision node 130. The redundant mesh network can also be static such that communication routes are predetermined in the event of one or more malfunctioning nodes. Network 135 can receive/transmit messages over a large range as compared to the actual wireless range of individual nodes. Network 135 can also receive/transmit messages through various wireless obstacles by utilizing the mesh network capability of evacuation system 100. As an example, a message destined from an origin of node A to a distant destination of node Z (i.e., where node A and node Z are not in direct range of one another) may use any of the nodes between node A and node Z to convey the information. In one embodiment, the mesh network can operate within the 2.4 GHz range. Alternatively, any other range(s) may be used.

In an illustrative embodiment, each of sensory nodes 105, 110, 115, and 120 and/or each of decision nodes 125 and 130 can know its location. The location can be global positioning system (GPS) coordinates. In one embodiment, a computing device 145 can be used to upload the location to sensory nodes 105, 110, 115, and 120 and/or decision nodes 125 and 130. Computing device 145 can be a portable GPS system, a cellular device, a laptop computer, or any other type of communication device configured to convey the location. As an example, computing device 145 can be a GPS-enabled laptop computer. During setup and installation of evacuation system 100, a technician can place the GPS-enabled laptop computer proximate to sensory node 105. The GPS-enabled laptop computer can determine its current GPS coordinates, and the GPS coordinates can be uploaded to sensory node 105. The GPS coordinates can be uploaded to sensory node 105 wirelessly through network 135 or through a wired connection. Alternatively, the GPS coordinates can be manually entered through a user interface of sensory node 105. The GPS coordinates can similarly be uploaded to sensory nodes 110, 115, and 120 and decision nodes 125 and 130. In one embodiment, sensory nodes 105, 110, 115, and 120 and/or decision nodes 125 and 130 may be GPS-enabled for determining their respective locations. In one embodiment, each node can have a unique identification number or tag, which may be programmed during the manufacturing of the node. The identification can be used to match the GPS coordinates to the node during installation. Computing device 145 can use the identification information to obtain a one-to-one connection with the node to correctly program the GPS coordinates over network 135. In an alternative embodiment, GPS coordinates may not be used, and the location can be in terms of position with a particular structure. For example, sensory node 105 may be located in room five on the third floor of a hotel, and this information can be the location information for sensory node 105. Regardless of how the locations are represented, evacuation system 100 can determine the evacuation route(s) based at least in part on the locations and a known layout of the structure.

In one embodiment, a zeroing and calibration method may be employed to improve the accuracy of the indoor GPS positioning information programmed into the nodes during installation. Inaccuracies in GPS coordinates can occur due to changes in the atmosphere, signal delay, the number of viewable satellites, etc., and the expected accuracy of GPS is usually about 6 meters. To calibrate the nodes and improve location accuracy, a relative coordinated distance between nodes can be recorded as opposed to a direct GPS coordinate. Further improvements can be made by averaging multiple GPS location coordinates at each perspective node over a given period (i.e., 5 minutes, etc.) during evacuation system 100 configuration. At least one node can be designated as a zeroing coordinate location. All other measurements can be made with respect to the zeroing coordinate location. In one embodiment, the accuracy of GPS coordinates can further be improved by using an enhanced GPS location band such as the military P(Y) GPS location band. Alternatively, any other GPS location band may be used.

FIG. 2 is a block diagram illustrating a sensory node 200 in accordance with an illustrative embodiment. In alternative embodiments, sensory node 200 may include additional, fewer, and/or different components. Sensory node 200 includes sensor(s) 205, a power source 210, a memory 215, a user interface 220, an occupancy unit 225, a transceiver 230, a warning unit 235, and a processor 240. Sensor(s) 205 can include a smoke detector, a heat sensor, a carbon monoxide sensor, a nitrogen dioxide sensor, and/or any other type of hazardous condition sensor known to those of skill in the art. In an illustrative embodiment, power source 210 can be a battery. Sensory node 200 can also be hard-wired to the structure such that power is received from the power supply of the structure (i.e., utility grid, generator, solar cell, fuel cell, etc.). In such an embodiment, power source 210 can also include a battery for backup during power outages.

Memory 215 can be configured to store identification information corresponding to sensory node 200. The identification information can be any indication through which other sensory nodes and decision nodes are able to identify sensory node 200. Memory 215 can also be used to store location information corresponding to sensory node 200. The location information can include global positioning system (GPS) coordinates, position within a structure, or any other information which can be used by other sensory nodes and/or decision nodes to determine the location of sensory node 200. In one embodiment, the location information may be used as the identification information. The location information can be received from computing device 145 described with reference to FIG. 1, or from any other source. Memory 215 can further be used to store routing information for a mesh network in which sensory node 200 is located such that sensory node 200 is able to forward information to appropriate nodes during normal operation and in the event of one or more malfunctioning nodes. Memory 215 can also be used to store occupancy information and/or one or more evacuation messages to be conveyed in the event of an evacuation condition. Memory 215 can further be used for storing adaptive occupancy pattern recognition algorithms and for storing compiled occupancy patterns.

User interface 220 can be used by a system administrator or other user to program and/or test sensory node 200. User interface 220 can include one or more controls, a liquid crystal display (LCD) or other display for conveying information, one or more speakers for conveying information, etc. In one embodiment, a user can utilize user interface 220 to record an evacuation message to be played back in the event of an evacuation condition. As an example, sensory node 200 can be located in a bedroom of a small child. A parent of the child can record an evacuation message for the child in a calm, soothing voice such that the child does not panic in the event of an evacuation condition. An example evacuation message can be "wake up Kristin, there is a fire, go out the back door and meet us in the back yard as we have practiced." Different evacuation messages may be recorded for different evacuation conditions. Different evacuation messages may also be recorded based on factors such as the location at which the evacuation condition is detected. As an example, if a fire is detected by any of sensory nodes one through six, a first pre-recorded evacuation message can be played (i.e., exit through the back door), and if the fire is detected at any of nodes seven through twelve, a second pre-recorded evacuation message can be played (i.e., exit through the front door). User interface 220 can also be used to upload location information to sensory node 200, to test sensory node 200 to ensure that sensory node 200 is functional, to adjust a volume level of sensory node 200, to silence sensory node 200, etc. User interface 220 can also be used to alert a user of a problem with sensory node 200 such as low battery power or a malfunction. In one embodiment, user interface 220 can be used to record a personalized message in the event of low battery power, battery malfunction, or other problem. For example, if the device is located within a home structure, the pre-recorded message may indicate that "the evacuation detector in the hallway has low battery power, please change." User interface 220 can further include a button such that a user can report an evacuation condition and activate the evacuation system. User interface 220 can be, for example, an application on a smart phone.

Occupancy unit 225 can be used to detect and/or monitor occupancy of a structure. As an example, occupancy unit 225 can detect whether one or more individuals are in a given room or area of a structure. A decision node can use this occupancy information to determine an appropriate evacuation route or routes. As an example, if it is known that two individuals are in a given room, a single evacuation route can be used. However, if three hundred individuals are in the room, multiple evacuation routes may be provided to prevent congestion. Occupancy unit 225 can also be used to monitor occupancy patterns. As an example, occupancy unit 225 can determine that there are generally numerous individuals in a given room or location between the hours of 8:00 am and 6:00 pm on Mondays through Fridays, and that there are few or no individuals present at other times. A decision node can use this information to determine appropriate evacuation route(s). Information determined by occupancy unit 225 can also be used to help emergency responders in responding to the evacuation condition. For example, it may be known that one individual is in a given room of the structure. The emergency responders can use this occupancy information to focus their efforts on getting the individual out of the room. The occupancy information can be provided to an emergency response center along with a location and type of the evacuation condition. Occupancy unit 225 can also be used to help sort rescue priorities based at least in part on the occupancy information while emergency responders are on route to the structure.

Occupancy unit 225 can detect/monitor the occupancy using one or more motion detectors to detect movement. Occupancy unit 225 can also use a video or still camera and video/image analysis to determine the occupancy. Occupancy unit 225 can also use respiration detection by detecting carbon dioxide gas emitted as a result of breathing. An example high sensitivity carbon dioxide detector for use in respiration detection can be the MG-811 CO2 sensor manufactured by Henan Hanwei Electronics Co., Ltd. based in Zhengzhou, China. Alternatively, any other high sensitivity carbon dioxide sensor may be used. Occupancy unit 225 can also be configured to detect methane, or any other gas which may be associated with human presence.

Occupancy unit 225 can also use infrared sensors to detect heat emitted by individuals. In one embodiment, a plurality of infrared sensors can be used to provide multidirectional monitoring. Alternatively, a single infrared sensor can be used to scan an entire area. The infrared sensor(s) can be combined with a thermal imaging unit to identify thermal patterns and to determine whether detected occupants are human, feline, canine, rodent, etc. The infrared sensors can also be used to determine if occupants are moving or still, to track the direction of occupant traffic, to track the speed of occupant traffic, to track the volume of occupant traffic, etc. This information can be used to alert emergency responders to a panic situation, or to a large captive body of individuals. Activities occurring prior to an evacuation condition can be sensed by the infrared sensors and recorded by the evacuation system. As such, suspicious behavioral movements occurring prior to an evacuation condition can be sensed and recorded. For example, if the evacuation condition was maliciously caused, the recorded information from the infrared sensors can be used to determine how quickly the area was vacated immediately prior to the evacuation condition. Infrared sensor based occupancy detection is described in more detail in an article titled "Development of Infrared Human Sensor" in the Matsushita Electric Works (MEW) Sustainability Report 2004, the entire disclosure of which is incorporated herein by reference.

Occupancy unit 225 can also use audio detection to identify noises associated with occupants such as snoring, respiration, heartbeat, voices, etc. The audio detection can be implemented using a high sensitivity microphone which is capable of detecting a heartbeat, respiration, etc. from across a room. Any high sensitivity microphone known to those of skill in the art may be used. Upon detection of a sound, occupancy unit 225 can utilize pattern recognition to identify the sound as speech, a heartbeat, respiration, snoring, etc. Occupancy unit 225 can similarly utilize voice recognition and/or pitch tone recognition to distinguish human and non-human occupants and/or to distinguish between different human occupants. As such, emergency responders can be informed whether an occupant is a baby, a small child, an adult, a dog, etc. Occupancy unit 225 can also detect occupants using scent detection. An example sensor for detecting scent is described in an article by Jacqueline Mitchell titled "Picking Up the Scent" and appearing in the August 2008 Tufts Journal, the entire disclosure of which is incorporated herein by reference.

In an alternative embodiment, sensory node 200 (and/or decision node 300 described with reference to FIG. 3) can be configured to broadcast occupancy information. In such an embodiment, emergency response personnel can be equipped with a portable receiver configured to receive the broadcasted occupancy information such that the responder knows where any humans are located with the structure. The occupancy information can also be broadcast to any other type of receiver. The occupancy information can be used to help rescue individuals in the event of a fire or other evacuation condition. The occupancy information can also be used in the event of a kidnapping or hostage situation to identify the number of victims involved, the number of perpetrators involved, the locations of the victims and/or perpetrators, etc.

Transceiver 230 can include a transmitter for transmitting information and/or a receiver for receiving information. As an example, transceiver 230 of sensory node 200 can receive status information, occupancy information, evacuation condition information, etc. from a first sensory node and forward the information to a second sensory node or to a decision node. Transceiver 230 can also be used to transmit information corresponding to sensory node 200 to another sensory node or a decision node. For example, transceiver 230 can periodically transmit occupancy information to a decision node such that the decision node has the occupancy information in the event of an evacuation condition. Alternatively, transceiver 230 can be used to transmit the occupancy information to the decision node along with an indication of the evacuation condition. Transceiver 230 can also be used to receive instructions regarding appropriate evacuation routes and/or the evacuation routes from a decision node. Alternatively, the evacuation routes can be stored in memory 215 and transceiver 230 may only receive an indication of which evacuation route to convey.

Warning unit 235 can include a speaker and/or a display for conveying an evacuation route or routes. The speaker can be used to play an audible voice evacuation message. The evacuation message can be conveyed in one or multiple languages, depending on the embodiment. If multiple evacuation routes are used based on occupancy information or the fact that numerous safe evacuation routes exist, the evacuation message can include the multiple evacuation routes in the alternative. For example, the evacuation message may state "please exit to the left through stairwell A, or to the right through stairwell B." The display of warning unit 235 can be used to convey the evacuation message in textual form for deaf individuals or individuals with poor hearing. Warning unit 235 can further include one or more lights to indicate that an evacuation condition has been detected and/or to illuminate at least a portion of an evacuation route. In the event of an evacuation condition, warning unit 235 can be configured to repeat the evacuation message(s) until a stop evacuation message instruction is received from a decision node, until the evacuation system is reset or muted by a system administrator or other user, or until sensory node 200 malfunctions due to excessive heat, etc. Warning unit 235 can also be used to convey a status message such as "smoke detected in room thirty-five on the third floor." The status message can be played one or more times in between the evacuation message. In an alternative embodiment, sensory node 200 may not include warning unit 235, and the evacuation route(s) may be conveyed only by decision nodes. The evacuation condition may be detected by sensory node 200, or by any other node in direct or indirect communication with sensory node 200.

Processor 240 can be operatively coupled to each of the components of sensory node 200, and can be configured to control interaction between the components. For example, if an evacuation condition is detected by sensor(s) 205, processor 240 can cause transceiver 230 to transmit an indication of the evacuation condition to a decision node. In response, transceiver 230 can receive an instruction from the decision node regarding an appropriate evacuation message to convey. Processor 240 can interpret the instruction, obtain the appropriate evacuation message from memory 215, and cause warning unit 235 to convey the obtained evacuation message. Processor 240 can also receive inputs from user interface 220 and take appropriate action. Processor 240 can further be used to process, store, and/or transmit occupancy information obtained through occupancy unit 225. Processor 240 can further be coupled to power source 210 and used to detect and indicate a power failure or low battery condition. In one embodiment, processor 240 can also receive manually generated alarm inputs from a user through user interface 220. As an example, if a fire is accidently started in a room of a structure, a user may press an alarm activation button on user interface 220, thereby signaling an evacuation condition and activating warning unit 235. In such an embodiment, in the case of accidental alarm activation, sensory node 200 may inform the user that he/she can press the alarm activation button a second time to disable the alarm. After a predetermined period of time (i.e., 5 seconds, 10 seconds, 30 seconds, etc.), the evacuation condition may be conveyed to other nodes and/or an emergency response center through the network.

FIG. 3 is a block diagram illustrating a decision node 300 in accordance with an illustrative embodiment. In alternative embodiments, decision node 300 may include additional, fewer, and/or different components. Decision node 300 includes a power source 305, a memory 310, a user interface 315, a transceiver 320, a warning unit 325, and a processor 330. In one embodiment, decision node 300 can also include sensor(s) and/or an occupancy unit as described with reference to sensory unit 200 of FIG. 2. In an illustrative embodiment, power source 305 can be the same or similar to power source 210 described with reference to FIG. 2. Similarly, user interface 315 can be the same or similar to user interface 220 described with reference to FIG. 2, and warning unit 325 can be the same or similar to warning unit 235 described with reference to FIG. 2.

Memory 310 can be configured to store a layout of the structure(s) in which the evacuation system is located, information regarding the locations of sensory nodes and other decision nodes, information regarding how to contact an emergency response center, occupancy information, occupancy detection and monitoring algorithms, and/or an algorithm for determining an appropriate evacuation route. Transceiver 320, which can be similar to transceiver 230 described with reference to FIG. 2, can be configured to receive information from sensory nodes and other decision nodes and to transmit evacuation routes to sensory nodes and/or other decision nodes. Processor 330 can be operatively coupled to each of the components of decision node 300, and can be configured to control interaction between the components.

In one embodiment, decision node 300 can be an exit sign including an EXIT display in addition to the components described with reference to FIG. 3. As such, decision node 300 can be located proximate an exit of a structure, and warning unit 325 can direct individuals toward or away from the exit depending on the identified evacuation route(s). In an alternative embodiment, all nodes of the evacuation system may be identical such that there is not a distinction between sensory nodes and decision nodes. In such an embodiment, all of the nodes can have sensor(s), an occupancy unit, decision-making capability, etc.

FIG. 4 is a flow diagram illustrating operations performed by an evacuation system in accordance with an illustrative embodiment. In alternative embodiments, additional, fewer, and/or different operations may be performed. Further, the use of a flow diagram is not meant to be limiting with respect to the order of operations performed. Any of the operations described with reference to FIG. 4 can be performed by one or more sensory nodes and/or by one or more decision nodes. In an operation 400, occupancy information is identified. The occupancy information can include information regarding a number of individuals present at a given location at a given time (i.e., current information). The occupancy information can also include occupancy patterns based on long term monitoring of the location. The occupancy information can be identified using occupancy unit 225 described with reference to FIG. 2 and/or by any other methods known to those of skill in the art. The occupancy information can be specific to a given node, and can be determined by sensory nodes and/or decision nodes.

In an operation 405, an evacuation condition is identified. The evacuation condition can be identified by a sensor associated with a sensory node and/or a decision node. The evacuation condition can result from the detection of smoke, heat, toxic gas, etc. A decision node can receive an indication of the evacuation condition from a sensory node or other decision node. Alternatively, the decision node may detect the evacuation condition using one or more sensors. The indication of the evacuation condition can identify the type of evacuation condition detected and/or a magnitude or severity of the evacuation condition. As an example, the indication of the evacuation condition may indicate that a high concentration of carbon monoxide gas was detected.

In an operation 410, location(s) of the evacuation condition are identified. The location(s) can be identified based on the identity of the node(s) which detected the evacuation condition. For example, the evacuation condition may be detected by node A. Node A can transmit an indication of the evacuation condition to a decision node B along with information identifying the transmitter as node A. Decision node B can know the coordinates or position of node A and use this information in determining an appropriate evacuation route. Alternatively, node A can transmit its location (i.e., coordinates or position) along with the indication of the evacuation condition.

In an operation 415, one or more evacuation routes are determined. In an illustrative embodiment, the one or more evacuation routes can be determined based at least in part on a layout of the structure, the occupancy information, the type of evacuation condition, the severity of the evacuation condition, and/or the location(s) of the evacuation condition. In an illustrative embodiment, a first decision node to receive an indication of the evacuation condition or to detect the evacuation condition can be used to determine the evacuation route(s). In such an embodiment, the first decision node to receive the indication can inform any other decision nodes that the first decision node is determining the evacuation route(s), and the other decision nodes can be configured to wait for the evacuation route(s) from the first decision node. Alternatively, multiple decision nodes can simultaneously determine the evacuation route(s) and each decision node can be configured to convey the evacuation route(s) to a subset of sensory nodes. Alternatively, multiple decision nodes can simultaneously determine the evacuation route(s) for redundancy in case any one of the decision nodes malfunctions due to the evacuation condition. In one embodiment, each decision node can be responsible for a predetermined portion of the structure and can be configured to determine evacuation route(s) for that predetermined portion or area. For example, a first decision node can be configured to determine evacuation route(s) for evacuating a first floor of the structure, a second decision node can be configured to determine evacuation route(s) for evacuating a second floor of the structure, and so on. In such an embodiment, the decision nodes can communicate with one another such that each of the evacuation route(s) is based at least in part on the other evacuation route(s).

As indicated above, the one or more evacuation routes can be determined based at least in part on the occupancy information. As an example, the occupancy information may indicate that approximately 50 people are located in a conference room in the east wing on the fifth floor of a structure and that 10 people are dispersed throughout the third floor of the structure. The east wing of the structure can include an east stairwell that is rated for supporting the evacuation of 100 people. If there are no other large groups of individuals to be directed through the east stairwell and the east stairwell is otherwise safe, the evacuation route can direct the 50 people toward the east stairwell, down the stairs to a first floor lobby, and out of the lobby through a front door of the structure. In order to prevent congestion on the east stairwell, the evacuation route can direct the 10 people from the third floor of the structure to evacuate through a west stairwell assuming that the west stairwell is otherwise safe and uncongested. As another example, the occupancy information can be used to designate multiple evacuation routes based on the number of people known to be in a given area and/or the number of people expected to be in a given area based on historical occupancy patterns.

The one or more evacuation routes can also be determined based at least in part on the type of evacuation condition. For example, in the event of a fire, all evacuation routes can utilize stairwells, doors, windows, etc. However, if a toxic gas such as nitrogen dioxide is detected, the evacuation routes may utilize one or more elevators in addition to stairwells, doors, windows, etc. For example, nitrogen dioxide may be detected on floors 80-100 of a building. In such a situation, elevators may be the best evacuation option for individuals located on floors 90-100 to evacuate. Individuals on floors 80-89 can be evacuated using a stairwell and/or elevators, and individuals on floors 2-79 can be evacuated via the stairwell. In an alternative embodiment, elevators may not be used as part of an evacuation route. In one embodiment, not all evacuation conditions may result in an entire evacuation of the structure. An evacuation condition that can be geographically contained may result in a partial evacuation of the structure. For example, nitrogen dioxide may be detected in a room on the ground floor with an open window, where the nitrogen dioxide is due to an idling vehicle proximate the window. The evacuation system may evacuate only the room in which the nitrogen dioxide was detected. As such, the type and/or severity of the evacuation condition can dictate not only the evacuation route, but also the area to be evacuated.

The one or more evacuation routes can also be determined based at least in part on the severity of the evacuation condition. As an example, heat may be detected in the east stairwell and the west stairwell of a structure having only the two stairwells. The heat detected in the east stairwell may be 120 degrees Fahrenheit (F) and the heat detected in the west stairwell may be 250 degrees F. In such a situation, if no other options are available, the evacuation routes can utilize the east stairwell. The concentration of a detected toxic gas can similarly be used to determine the evacuation routes. The one or more evacuation routes can further be determined based at least in part on the location(s) of the evacuation condition. As an example, the evacuation condition can be identified by nodes located on floors 6 and 7 of a structure and near the north stairwell of the structure. As such, the evacuation route for individuals located on floors 2-5 can utilize the north stairwell of the structure, and the evacuation route for individuals located on floors 6 and higher can utilize a south stairwell of the structure.

In an operation 420, the one or more evacuation routes are conveyed. In an illustrative embodiment, the one or more evacuation routes can be conveyed by warning units of nodes such as warning unit 235 described with reference to FIG. 2 and warning unit 325 described with reference to FIG. 3. In an illustrative embodiment, each node can convey one or more designated evacuation routes, and each node may convey different evacuation route(s). Similarly, multiple nodes may all convey the same evacuation route(s). In an operation 425, an emergency response center is contacted. The evacuation system can automatically provide the emergency response center with occupancy information, a type of the evacuation condition, a severity of the evacuation condition, and/or the location(s) of the evacuation condition. As such, emergency responders can be dispatched immediately. The emergency responders can also use the information to prepare for the evacuation condition and respond effectively to the evacuation condition.

In one embodiment, occupancy unit 225 of FIG. 2 can also be implemented as and/or used in conjunction with a portable, handheld occupancy unit. The portable occupancy unit can be configured to detect human presence using audible sound detection, infrared detection, respiration detection, motion detection, scent detection, etc. as described above, and/or ultrasonic detection. Firefighters, paramedics, police, etc. can utilize the portable occupancy unit to determine whether any human is present in a room with limited or no visibility. As such, the emergency responders can quickly scan rooms and other areas without expending the time to fully enter the room and perform an exhaustive manual search.

Figure 5:
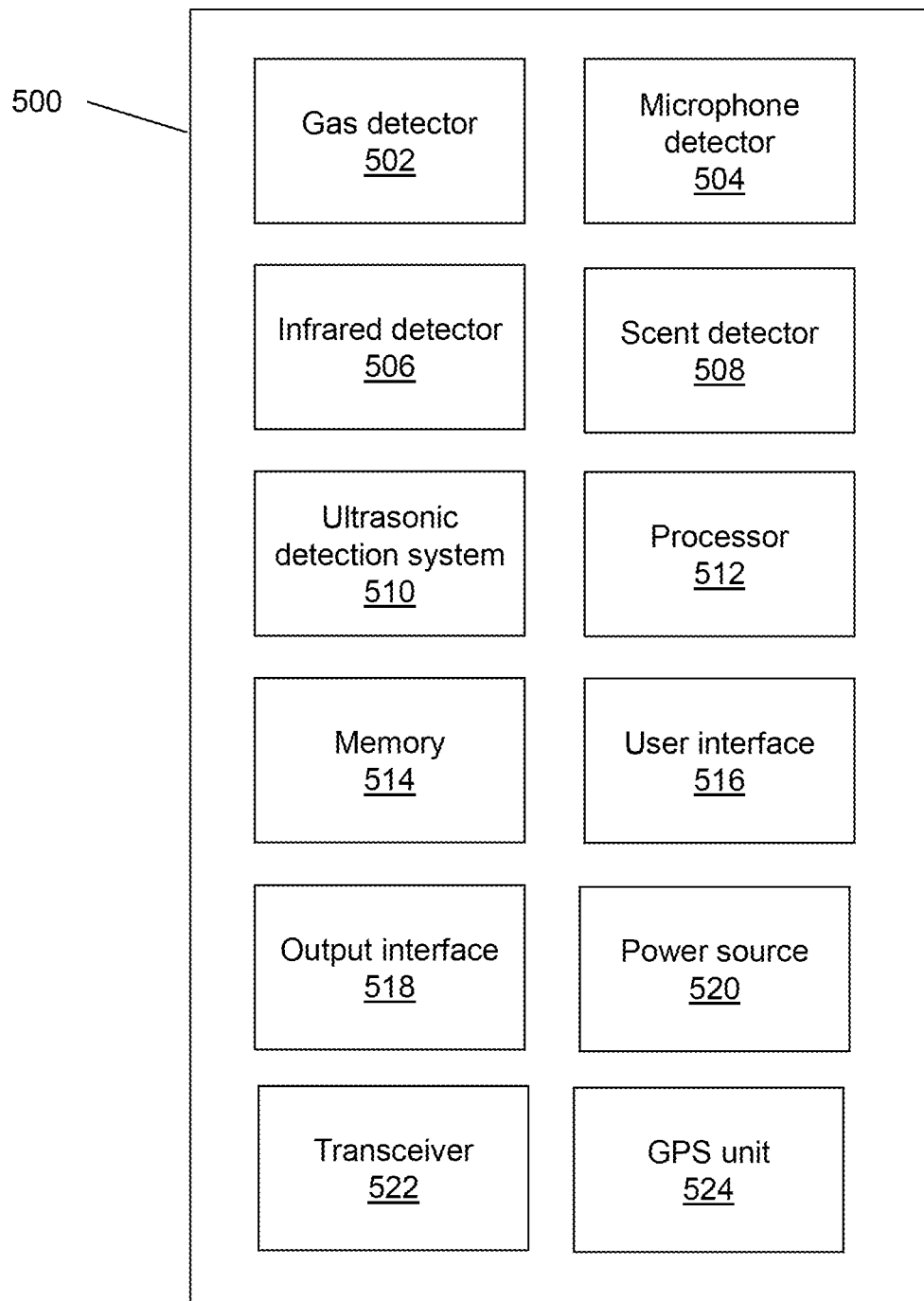
FIG. 5 is a block diagram illustrating a portable occupancy unit in accordance with an illustrative embodiment.

FIG. 5 is a block diagram illustrating a portable occupancy unit 500 in accordance with an illustrative embodiment. In one embodiment, portable occupancy unit 500 can be implemented as a wand having sensors on one end, a handle on the other end, and a display in between the sensors and the handle. Alternatively, any other configuration may be used. For example, as described in more detail below, at least a portion of portable occupancy unit 500 may be incorporated into an emergency response suit.

Portable occupancy unit 500 includes a gas detector 502, a microphone detector 504, an infrared detector 506, a scent detector 508, an ultrasonic detection system 510, a processor 512, a memory 514, a user interface 516, an output interface 518, a power source 520, a transceiver 522, and a global positioning system (GPS) unit 524. In alternative embodiments, portable occupancy unit 500 may include fewer, additional, and/or different components. In one embodiment, portable occupancy unit 500 can be made from fire retardant materials and/or other materials with a high melting point or heat tolerance in the event that portable occupancy unit 500 is used at the site of a fire. Alternatively, any other materials may be used to construct portable occupancy unit 500. Gas detector 502, microphone detector 504, infrared detector 506, and scent detector 508 can be used to detect occupancy as described above with reference to occupancy unit 225 of FIG. 2.

Ultrasonic detection system 510 can be configured to detect human presence using ultrasonic wave detection. In one embodiment, ultrasonic detection system 510 can include a wave generator and a wave detector. The wave generator can emit ultrasonic waves into a room or other structure. The ultrasonic waves can reflect off of the walls of the room or other structure. The wave detector can receive and examine the reflected ultrasonic waves to determine whether there is a frequency shift in the reflected ultrasonic waves with respect to the originally generated ultrasonic waves. Any frequency shift in the reflected ultrasonic waves can be caused by movement of a person or object within the structure. As such, an identified frequency shift can be used to determine whether the structure is occupied. Alternatively, processor 512 may be used to identify frequency shifts in the reflected ultrasonic waves. In one embodiment, occupancy unit 225 described with reference to FIG. 2 can also include an ultrasonic detection system.

Processor 512 can be used to process detected signals received from gas detector 502, microphone detector 504, infrared detector 506, scent detector 508, and/or ultrasonic detection system 510. In an illustrative embodiment, processor 512 can utilize one or more signal acquisition circuits (not shown) and/or one or more algorithms to process the detected signals and determine occupancy data. In one embodiment, processor 512 can utilize the one or more algorithms to determine a likelihood that an occupant is present in a structure. For example, if the detected signals are low, weak, or contain noise, processor 512 may determine that there is a low likelihood that an occupant is present. The likelihood can be conveyed to a user of portable occupancy unit 500 as a percentage, a description (i.e., low, medium, high), etc. Alternatively, processor 512 can determine the likelihood that an occupant is present and compare the likelihood to a predetermined threshold. If the likelihood exceeds the threshold, portable occupancy unit 500 can alert the user to the potential presence of an occupant. If the determined likelihood does not exceed the threshold, portable occupancy unit 500 may not alert the user.

In an illustrative embodiment, processor 512 can determine whether occupants are present based on the combined input from each of gas detector 502, microphone detector 504, infrared detector 506, scent detector 508, and/or ultrasonic detection system 510. In an illustrative embodiment, the one or more algorithms used by processor 512 to determine occupancy can be weighted based on the type of sensor(s) that identify an occupant, the number of sensors that identify the occupant, and/or the likelihood of occupancy corresponding to each of the sensor(s) that identified the occupant. As an example, detection by ultrasonic detection system 510 (or any of the other detectors) may be given more weight than detection by scent detector 508 (or any of the other detectors). As another example, processor 512 may increase the likelihood of occupancy as the number of detectors that detected any sign of occupancy increases. Processor 512 can also determine the likelihood of occupancy based on the likelihood corresponding to each individual sensor. For example, if all of the detectors detect occupancy with a low likelihood of accuracy, the overall likelihood of a present occupant may be low. In one embodiment, any sign of occupancy by any of the sensors can cause processor 512 to alert the user. Similarly, processor 512 can provide the user with information such as the overall likelihood of occupancy, the likelihood associated with each sensor, the number of sensors that detected occupancy, the type of sensors that detected occupancy, etc. such that the user can make an informed decision.

Processor 512 can also be used to monitor and track the use of portable occupancy unit 500 such that a report can be created, stored, and/or conveyed to a recipient. As an example, the report can include a time, location, and likelihood of occupancy for each potential occupant that is identified by portable occupancy unit 500. The report can also include any commands received from the user of portable occupancy unit 500, any information received from outside sources and conveyed to the user through portable occupancy unit 500, etc. The report can be stored in memory 514. The report can also be conveyed to an emergency response center, other emergency responders, etc. via transceiver 522.

In addition to informing a user of whether an occupant is detected and/or a likelihood that the detection is accurate, portable occupancy unit 500 can also inform the user whether a detected occupant is a human or an animal (i.e., dog, cat, rat, etc.) using infrared pattern analysis based on information received from infrared detector 506 and/or audible sound analysis based on information received from microphone detector 504. Portable occupancy unit 500 can also use detected information and pattern analysis to determine and convey a number of persons or animals detected and/or whether detected persons are moving, stationary, sleeping, etc. In one embodiment, portable occupancy unit 500 can also use temperature detection through infrared detector 506 and/or any of the other detection methods to help determine and convey whether a detected occupant is dead or alive.

In one embodiment, a separate signal acquisition circuit can be used to detect/receive signals for each of gas detector 502, microphone detector 504, infrared detector 506, scent detector 508, and ultrasonic detection system 510. Alternatively, one or more combined signal acquisition circuits may be used. Similarly, a separate algorithm can be used to process signals detected from each of gas detector 502, microphone detector 504, infrared detector 506, scent detector 508, and ultrasonic detection system 510. Alternatively, one or more combined algorithms may be used.

The one or more algorithms used by processor 512 can include computer-readable instructions and can be stored in memory 514. Memory 514 can also be used to store present occupancy information, a layout or map of a structure, occupancy pattern information, etc. User interface 516 can be used to receive inputs from a user for programming and use of portable occupancy unit 500. In one embodiment, user interface 516 can include voice recognition capability for receiving audible commands from the user. Output interface 518 can include a display, one or more speakers, and/or any other components through which portable occupancy unit 500 can convey an output regarding whether occupants are detected, etc. Power source 520 can be a battery and/or any other source for powering portable occupancy unit 500.

Transceiver 522 can be used to communicate with occupancy unit 225 and/or any other source. As such, portable occupancy unit 500 can receive present occupancy information and/or occupancy pattern information from occupancy unit 225. Portable occupancy unit 500 can use the present occupancy information and/or occupancy pattern information to help determine a likelihood that one or more humans is present in a given area. For example, the occupancy pattern information may indicate that there is generally a large number of people in a given area at a given time. If used in the given area at or near the given time, the occupancy detection algorithms used by portable occupancy unit 500 may be adjusted such that any indication of occupancy is more likely to be attributed to human occupancy. The present occupancy information can be similarly utilized. Transceiver 522 can also be used to receive information regarding the type of evacuation condition, a location of the evacuation condition, a temperature at a given location, a toxic gas concentration at a given location, etc. The information, which can be received from the evacuation system, an emergency response center, and/or any other source, can be used by the user to identify high risk areas, to identify an optimal route to a given location, etc.

Transceiver 522 can also include short range communication capability such as Bluetooth, Zigbee, Bluetooth Low Energy, etc. for conveying information to a user that is wearing a firefighter suit or other emergency responder suit. For example, transceiver 522 can convey information regarding a detected occupant to an earpiece of the user and/or for conveyance through a speaker or display screen built into a helmet of the suit worn by the user. Transceiver 522 can also receive information from a transmitter incorporated into the suit worn by the user. For example, the transmitter incorporated into the suit can transmit voice or other commands to transceiver 522 of portable occupancy unit 500. As such, the user can control portable occupancy unit 500 while wearing bulky fire retardant gloves and/or other protective equipment.

Global positioning system (GPS) unit 524 can be configured to direct a user of portable occupancy unit 500 to a known location of an occupant using output interface 518. The known location can be received from occupancy unit 225, from an emergency response center, and/or from any other source. In an alternative embodiment, portable occupancy unit 500 can receive verbal and/or textual directions to a known location of an occupant. The verbal and/or textual directions can be received from occupancy unit 225, from the emergency response center, and/or from any other source. The verbal and/or textual directions can be conveyed to a user through output interface 518.

Global positioning system unit 524 can also be used to determine a current location of portable occupancy unit 500 for conveyance to an emergency response center, other portable occupancy units, occupancy unit 225, other computing devices, etc. The current location can be conveyed by transceiver 522. The current location can be used to determine a location of a user of portable occupancy unit 500, to tag a located occupant, to tag a potential source of a fire or other evacuation condition, etc. As an example, a user of portable occupancy unit 500 may locate an occupant in a room in which the occupant is not in immediate danger. The user can tag the room using GPS unit 524 and convey the location to an emergency responder such that the emergency responder can find the occupant and lead him/her safely out of the structure. As such, the user of portable occupancy unit 500 can continue searching for additional occupants that may be in more immediate danger.

In one embodiment, at least a portion of portable occupancy unit 500 may be incorporated into a suit of an emergency responder, such as a firefighter suit. For example, the sensors may be incorporated into a helmet of the suit, into one or both gloves of the suit, into a backpack of the suit, etc. The output interface may be incorporated into one or more speakers of the helmet of the suit. The output interface can also be incorporated into a display screen within the helmet of the suit. The processor, memory, user interface, power source, transceiver, and GPS unit can similarly be incorporated into the suit. In an alternative embodiment, at least the sensors and the transceiver may be incorporated into a wand or other portable unit, and the output interface, processor, memory, user interface, power source, and GPS unit can be incorporated into the suit.

In one embodiment, the system herein can be implemented using a remote server that is in communication with a plurality of sensory nodes that are located in a dwelling. The remote server can be used to process information reported by the sensory nodes and to control the sensory nodes. In one embodiment, the remote server can replace the decision node(s) such that a given dwelling is only equipped with the sensory nodes. In such an embodiment, the system can be implemented using cloud computing techniques as known to those of skill in the art.

Figure 6:
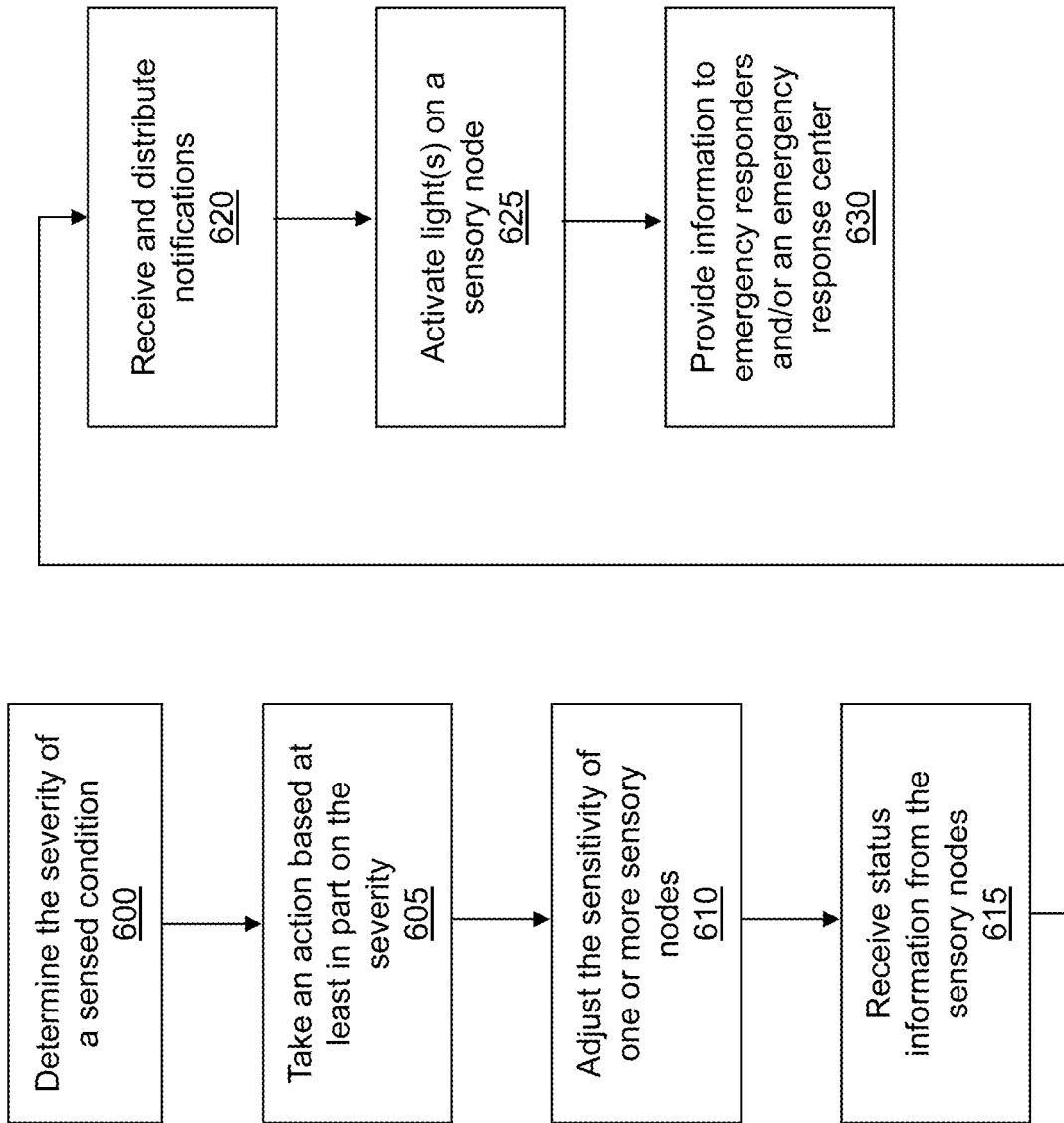
FIG. 6 is a flow diagram illustrating operations performed by an evacuation system in accordance with an illustrative embodiment.

FIG. 6 is a flow diagram illustrating operations performed by an evacuation system in accordance with an illustrative embodiment. In alternative embodiments, fewer, additional, and/or different operations may be performed. The use of a flow diagram is not meant to be limiting with respect to the order of operations performed. In an operation 600, the system determines a severity of a sensed condition. In one embodiment, the severity may be based at least in part on a rate of change (or spread rate) of the sensed condition. As an example, a condition may be detected at a first sensory node. The rate of change can be based on the amount of time it takes for other sensory nodes to sense the same condition or a related condition. If the other sensory nodes rapidly sense the condition after the initial sensing by the first sensory node, the system can determine that the condition is severe and rapidly spreading. As such, the severity of a sensed condition can be based at least in part on the rate at which the sensed condition is spreading. Detected occupancy can also be used to determine the severity of a sensed condition. As an example, a sensed condition may be determined to be more severe if there are any occupants present in the structure where the condition was sensed.

The type of sensed condition may also be used to determine the severity of a sensed condition. As an example, sensed smoke or heat indicative of a fire may be determined to be more severe than a sensed gas such as carbon monoxide, or vice versa. The amount of dispersion of a sensed condition may also be used to determine the severity of the sensed condition. In one embodiment, known GPS locations associated with each of the sensory nodes that have sensed a condition can be used to determine the dispersion of the condition. As an example, if numerous sensory nodes spread out over a large area detect the sensed condition, the system can determine that the severity is high based on the large amount of dispersion of the sensed condition. In one embodiment, the GPS locations associated with each of the nodes can be fine-tuned using wireless triangulation as known to those of skill in the art. As an example, a first node may be considered to be at location zero, and locations of all of the other nodes in the building/structure can be relative to location zero. Using wireless triangulation techniques, the relative signal strength of the nodes can be used to determine the locations of the nodes relative to location zero, and the determined locations can be used to replace and improve the accuracy of the GPS locations originally assigned to the nodes during installation.

The magnitude of the sensed condition can further be used to determine the severity of the sensed condition. As an example, a high temperature or large amount of smoke can indicate a fire of large magnitude, and the system can determine that the severity is high based on the large magnitude. As another example, a large amount of detected carbon dioxide can indicate a high risk to occupants and be designated an evacuation condition of high severity.

In an illustrative embodiment, the determination of whether a sensed condition has high severity can be based on whether any of the factors taken into consideration for determining severity exceed a predetermined threshold. As an example, a determination of high severity may be made based on the spread rate if a second sensory node detects the sensed condition (that was originally detected by a first sensory node) within 5 seconds of detection of the sensed condition by the first sensory node. Alternatively, the spread rate threshold may be 0.5 seconds, 1 second, 3 seconds, 10 seconds, etc. As another example, the high severity threshold for occupancy may be if one person or pet is detected in the building, if one person or pet is detected within a predetermined distance of the sensory node that sensed the condition, etc. With respect to magnitude, the high severity threshold may be if the temperature is greater than 150 degrees Fahrenheit (F), greater than 200 degrees F., greater than 300 degrees F., etc. The magnitude threshold may also be based on an amount of smoke detected, an amount of gas detected, etc. The high severity threshold with respect to dispersion can be if the sensed condition is detected by two or more sensory nodes, three or more sensory nodes, four or more sensory nodes, etc. The high severity threshold with respect to dispersion may also be in terms of a predetermined geographical area. As an example, the system may determine that the severity is high if the evacuation condition has dispersed an area larger than 100 square feet, 200 square feet, etc. The system may also determine that the severity is high if the evacuation condition has dispersed through at least two rooms of a structure, at least three rooms of the structure, etc.

In an operation 605, an action is taken based on the severity. In one embodiment, the system can prioritize the sensed condition based at least in part on the severity. A sensed condition with high severity may be prioritized higher than a sensed condition with low severity. In one embodiment, the priority can be provided to emergency rescue personnel as an indication of the urgency of the sensed condition. The emergency rescue personnel can use the severity indication to help determine the amount of resources (e.g., personnel, fire trucks, etc.) to deploy in response to the evacuation condition. The severity can also be used by the system to help determine whether a sensed condition is a false alarm. A sensed condition with a high severity can be determined to be an actual evacuation condition and the system can trigger the appropriate alarms, notifications, etc. In one embodiment, the severity of a sensed condition may also be used to control the sensitivity of the sensory node that sensed the condition and other sensory nodes in the vicinity of the sensory node that sensed the condition. Sensitivity adjustment is described below with respect to an operation 610.

In the operation 610, the sensitivity of one or more sensory nodes is adjusted. Sensitivity can refer to the rate at which a sensory node scans its environment for smoke, gas such as carbon monoxide, temperature, occupancy, battery power, ambient light, etc. Examples of sensitivity can be scanning twice a second, once a second, once every 5 seconds, once every 30 seconds, once a minute, once an hour, etc. As indicated above, in one embodiment, the system may adjust the sensitivity of one or more sensory nodes based on the severity of a sensed condition. As also described above, severity can be determined based on factors such as the rate of change of the sensed condition, detected occupancy, the type of sensed condition, the amount of dispersion of the sensed condition, the magnitude of the sensed condition, etc. As an example, smoke may be detected at a sensory node X, and sensory node X can transmit an indication that smoke was detected to a decision node and/or a remote server. If the decision node and/or remote server determine that the sensed condition has high severity, the system can increase the sensitivity of the sensory node X and/or sensory nodes Y and Z in the vicinity of sensory node X such that the scan rate for these nodes increases. The increased sensitivity can also result in a higher communication rate such that the decision node and/or remote server receive more frequent communications from sensory nodes X, Y, and Z regarding sensor readings. The increased sensitivity may also result in a reduction in one or more predetermined thresholds that the system uses to determine if a sensed condition has high severity, to determine if the sensed condition triggers a notification, etc.

The sensitivity of sensory nodes can also be adjusted if any sensory node detects a condition, regardless of the severity of the condition. As an example, the system may automatically increase the sensitivity of sensory nodes Y and Z (which are in the vicinity of sensory node X) if sensory node X detects a condition. The system may also increase the sensitivity of all sensory nodes in a building/structure if any one of the sensory nodes in that building/structure sense a condition. In one embodiment, in the event of an alternating current (AC) power failure, the sensitivity of sensory nodes may be decreased to conserve battery power within the sensory nodes. Similarly, in embodiments where AC power is not present, the system may decrease the sensitivity of any nodes that have low battery power.

The sensitivity of sensory nodes may also be controlled based on a location of the sensory node and/or a learned condition relative to the sensory node. For example, a sensory node in a kitchen or in a specific location within a kitchen (such as near the oven/stovetop) may have higher sensitivity than sensory nodes located in other portions of the structure. The sensitivity may also be higher in any sensory node where a condition has been previously detected, or in sensory nodes where a condition has been previously detected within a predetermined amount of time (e.g., within the last day, within the last week, within the last month, within the last year, etc.). The sensitivity may also be based on occupancy patterns. For example, the sensitivity of a given sensory node may be lower during times of the day when occupants are generally not in the vicinity of the node and raised during times of the day when occupants are generally in the vicinity of the node. The sensitivity may also be raised automatically any time that an occupant is detected within the vicinity of a given sensory node.

The sensitivity of a sensory node may also be increased in response to the failure of another sensory node. As an example, if a sensory node X is no longer functional due to loss of power or malfunction, the system can automatically increase the sensitivity of nodes Y and Z (which are in the vicinity of node X). In one embodiment, the system may increase the sensitivity of all nodes in a building/structure when any one of the sensory nodes in that building/structure fails. In another embodiment, the system may automatically increase the sensitivity of one or more nodes in a building/structure randomly or as part of a predetermined schedule.

The one or more nodes selected to have higher sensitivity can be changed periodically according to a predetermined or random time schedule. In such an embodiment, the other nodes in the building/structure (e.g., the nodes not selected to have the higher sensitivity) may have their sensitivity lowered or maintained at a normal sensitivity level, depending on the embodiment.

In an operation 615, status information regarding the sensory nodes is received from the sensory nodes. In an illustrative embodiment, the sensory nodes periodically provide status information to the decision node and/or remote server. The status information can include an identification of the sensory node, location information corresponding to the sensory node, information regarding battery life of the sensory node, information regarding whether the sensory node is functioning properly, information regarding whether any specific sensors of the sensory node are not functioning properly, information regarding whether the speaker(s) of the sensory node are functioning properly, information regarding the strength of the communication link used by the sensory node, etc. In one embodiment, information regarding the communication link of a sensory node may be detected/determined by the decision node and/or remote server. The status information can be provided by the sensory nodes on a predetermined periodic basis. In the event of a problem with any sensory node, the system can alert a system administrator (or user) of the problem. The system can also increase the sensitivity of one or more nodes in the vicinity of a sensory node that has a problem to help compensate for the deficient node. The system may also determine that a node which fails to timely provide status information according to a periodic schedule is defective and take appropriate action to notify the user and/or adjust the sensitivity of surrounding nodes.

In an operation 620, the system receives and distributes notifications. The notifications can be related to school closings, flight delays, food/drug recalls, natural disasters, weather, AMBER alerts for missing children, etc. The system can receive the notifications from any source known to those of skill in the art. In one embodiment, the notifications are received by the decision node and/or remote server and provided to one or more sensory nodes. The notifications can be provided to the sensory nodes as recorded messages that can be played through the speaker(s) of the sensory nodes. The notifications can also be provided to the sensory nodes as textual messages that are conveyed to users through a display on the sensory nodes. The display can be a liquid crystal display (LCD) or any other display type known to those of skill in the art. The notifications can also be provided to users as e-mails, text messages, voicemails, etc. independent of the sensory nodes.

In one embodiment, the system can determine the sensory nodes (e.g., locations) to which the notification applies and send the notification to sensory nodes and/or users located within that geographical area. The determination of which sensory nodes are to receive the notification can be based on information known to the system such as the school district in which nodes are located, the zip code in which nodes are located, etc. The sensory nodes in a given geographical area can also be determined based at least in part on the GPS locations associated with the sensory nodes. In an alternative embodiment, the nodes affected by a notification may be included in the notification such that the system does not determine the nodes to which the notification applies.

In one embodiment, users can tailor the mass notification feature of the system based on their desires/needs. For example, the user can filter notifications by designating the types of notifications that he/she wishes to receive. As such, only the desired type(s) of notifications will be provided to that user. The user may also designate one or more specific sensory nodes that are to receive and convey the notifications, such as only the node(s) in the kitchen, only the node(s) in the master bedroom, etc. The specific sensory node(s) designated to receive and convey the notification may also be based on the time of day that the notification is received. For example, the user may designate the node(s) in the kitchen to convey notifications between 8:00 am and 10:00 pm, and the node(s) in the master bedroom to convey notifications that are received from 10:01 pm through 7:59 am. The user can also select a volume that notifications are to be played at, and different volume levels may be designated for different times of day. The user may also pre-record messages that are to be conveyed through the speaker(s) of the sensory node(s) based on the type of notification. For example, in the event of a tornado notification, the pre-recorded message from the user may be "A tornado is approaching, please head to the basement and stay away from windows." Alternatively, default messages generated by the system or the mass notification system may be used. The user can further designate the number of times that a notification is to be repeated. In one embodiment, sensory nodes may include a notification light that indicates a notification has been received. The user can receive the notification by pushing a button on the sensory node to play the notification. In addition to the notification itself, the system may also provide instructions to the user for responding to the notification. The instructions may include an evacuation route, a place to go within a dwelling, a place not to go within the dwelling, to leave the dwelling etc.

In an operation 625, one or more lights on a sensory node are activated. The light(s) can be used to illuminate the immediate area of the sensory node to help occupants identify and utilize evacuation routes. In one embodiment, the light(s) on the sensory node can be light emitting diode (LED) lights. In one embodiment, the lights can be activated in the event of an AC power loss at a sensory node, regardless of whether an evacuation condition is sensed. In an alternative embodiment, the lights may be activated only if there is AC power loss and a detected evacuation condition. In one embodiment, the sensory nodes may include ambient light sensors, and the lights on the sensory node can be activated in the event of an evacuation condition where no or little ambient light is detected by the sensory node.

In one embodiment, the decision nodes and/or remote server may periodically transmit a heartbeat signal to the sensory nodes using communication links between the decision nodes/remote server and the sensory nodes. If the heartbeat signal is not received by a sensory node, the sensory node can poll surrounding sensory nodes to determine whether the surrounding nodes have received the heartbeat signal. If the surrounding nodes have received the heartbeat signal, the sensory node can determine that there is a problem with its communication link. If the surrounding nodes have not received the heartbeat signal, the sensory node can determine that there is a power loss or radio communication failure with the decision node and/or remote server. If it is determined that there is a power failure with a local decision node or server, the sensory node can be configured to detect whether there is sufficient ambient light in the vicinity, and to activate the one or more lights on the sensory node if there is not sufficient ambient light. In one embodiment, in the event of a power failure, the sensory nodes can also enter a lower power smoke detector mode in which the sensory node functions only as a traditional smoke detector to conserve battery power until AC power is restored.

In an operation 630, information is provided to emergency responders and/or an emergency call center. Emergency responders can be fire fighters, police officers, paramedics, etc. The emergency call center can be a 911 call center or other similar facility. In an illustrative embodiment, emergency responders can log in to the system to access information regarding evacuation conditions. A user interface can be provided for emergency responders to log in through a computing device such as a laptop computer, smart phone, desktop computer, etc. Individual emergency responders or entire emergency response units can have a unique username and password for logging in to the system. In one embodiment, the system can keep track of the time and identity of individuals who log in to the system.

Upon logging in to the system, the emergency responder can be provided with a list of sensed evacuation conditions. The list can include an identification of the type of sensed condition such as fire, smoke, gas, etc. The list can include a time at which the condition was first sensed or last sensed based on one or more timestamps from the sensory node(s) that detected the condition. The list can include an address where the condition was sensed and a number of individuals that live at or work at the address. The list can include the type of structure where the condition was sensed such as one story business, three story office building, two story residential home, ranch residential home, etc. The list can also include the size of the structure where the condition was sensed such as a square footage. The list can further include an indication of the response status such as whether anyone has responded to the condition, who has responded to the condition, the time that the condition was responded to, whether additional assistance is needed, etc. In one embodiment, when new entries are added to the list, an audible, textual, and or vibratory alarm can be transmitted from the computing device to notify the emergency responder that a new evacuation condition has been sensed.

In an illustrative embodiment, the first responder can select an entry from the list of in progress evacuation conditions to receive additional information regarding the selected entry. The additional information can include an animated isothermal view of the structure that shows the current temperatures throughout the structure based on temperatures detected by the sensory nodes within the structure. In addition to temperature zones, the animated isothermal view can illustrate window locations, door locations, any other exit/entry points of the structure, the road(s) nearest the structure, etc. In one embodiment, a separate isothermal view can be provided for each floor and/or each room of the structure, such as a first floor, second floor, third floor, basement, master bedroom, kitchen, etc. The additional information can include a time at which the condition was detected, a number of persons that live or work at the structure, ages of the persons that live or work at the structure, names of the persons that live or work at the structure, a number and/or type of pets at the structure, whether there are farm animals present, the type and/or number of farm animals present, a type of the structure, a size of the structure, a type and/or composition of roofing that the structure has, the type of truss system used in the structure, a type of siding of the structure (e.g., vinyl, aluminum, brick, etc.), whether the structure has sprinklers, whether there are any special needs individuals that live or work in the structure, the type of special needs individuals that live or work in the structure, a lot size of the location, characteristics of the lot such as hilly, trees, flat, etc., a number and/or type of vehicles (cars, trucks, boats, etc.) that may be present at the location, potential obstructions such as on street parking, steep driveway, and hills, etc. As discussed in further detail below, general information regarding the structure, occupants, lot, vehicles, etc. can be provided by the user during installation and setup of the system.

In one embodiment, the additional information can also include a number of occupants detected at the location at the current time and/or at the time the condition was detected. In such an embodiment, the system can track the number of occupants in a structure by monitoring the exit/entry points of the structure. The occupancy information can also include a location of the occupants. As an example, the system may determine that three occupants are located in a room of the structure, and that the temperature surrounding the room is high. As such, the emergency responders can determine that the three individuals are trapped in the room and make it a priority to get those individuals out of the structure.

The additional information can include a time when the condition was first detected, historical spread rates of the condition, the severity of the condition, the magnitude of the condition, the amount of dispersion of the condition, the current spread rate of the condition, etc. The amount of dispersion can be used to determine the extent of the evacuation condition and allow responders to determine an appropriate number of responders to send to the structure. As an example, if the system senses smoke and high temperature at every sensory node within the structure, the emergency responders can determine that a fire is present and has spread throughout the structure. Appropriate resources to fight the fire can then be dispatched.

The additional information can further include an estimated arrival time of the emergency responder to the location using any GPS navigational techniques known to those of skill in the art, the current time, and the condition at the location. The condition at the location can be estimated by the system based on sensed conditions, such as flames in the kitchen, flames in the basement, smoke throughout the structure, etc. The condition at the location may also be based on a first-hand account of an occupant of the structure. In one embodiment, the occupant can provide the first-hand account to an emergency call center operator who can enter the information into the system such that it is accessible by the emergency responders. The emergency call center operator can also enter additional information such as whether any responders are currently on site at the location, a number of responders on site, etc. The first-hand account may also be entered directly into the system by the occupant through a computing device once the occupant has evacuated the structure. The computing device can be handheld, such as a smart phone. The first-hand account can include information regarding the evacuation condition, information regarding occupants still in the structure, information regarding access to the structure, etc. In one embodiment, the user can verbally provide the information and the system can provide the verbal account to the emergency responder. Alternatively, the system can automatically transcribe the verbal account into text and provide the text to the emergency responder. In another embodiment, the user may textually provide the information.

The additional information regarding an evacuation condition can also include statistics regarding the condition. The statistics can include a heat rise at the structure in terms of degrees per time unit (e.g., 50 degrees F./second), a smoke rise at the structure in terms of parts per million (ppm) per time unit (e.g., 2000 ppm/second), and/or a gas rise such as a carbon monoxide level increase. The heat rise, smoke rise, and/or gas rise can be provided textually and/or visually through the use of a graph or chart. The statistics can also include a heat magnitude and/or smoke magnitude. The statistics can also include one or more locations of the dwelling where occupants were last detected, whether there is still AC power at the location, whether communication to/from the sensory nodes is still possible, whether there is any ambient light at the location, etc. In an illustrative embodiments, any of the statistics may be associated with a timestamp indicative of a time of the measurements, etc. that the statistic is based on.

The additional information regarding an evacuation condition can also include maps. The maps may include a street map of the area surrounding the location at which the evacuation condition was sensed, a map that illustrates utility locations and fire hydrants proximate to the location at which the evacuation condition was sensed, an overhead satellite view showing the location at which the evacuation condition was sensed, a map showing neighborhood density, etc. In one embodiment, one or more of the maps may highlight the route of the emergency responder such that the emergency responder knows the relative location of the structure as he/she arrives at the scene. The additional information may also include a weather report and/or predicted weather for the location at which the evacuation condition was sensed. The maps and/or weather information can be obtained from mapping and weather databases as known to those of skill in the art.

The additional information regarding an evacuation condition can also include pictures of the interior and/or exterior of the structure. The pictures can include one or more views of the home exterior, illustrating windows, doors, and other possible exits and/or one or more views of the lot on which the structure is located. The pictures can also include one or more interior views of the structure such as pictures of the kitchen, pictures of the bathroom(s), pictures of the bedroom(s), pictures of the basement, pictures of the family room(s), pictures of the dining room(s), etc. The pictures can further include blueprints of the structure. The blueprints can illustrate each floor/level of the structure, dimensions of rooms of the structure, locations of windows and doors, names of the rooms in the structure, etc. In one embodiment, construction information may be included in conjunction with the pictures. The construction information can include the type/composition of the roof, the type of truss system used, the type of walls in the structure, whether there is a basement, whether the basement is finished, whether the basement is exposed, whether the basement has egress windows, the type(s) of flooring in the structure, the utilities utilized by the structure such as water, electricity, natural gas, etc., the grade of the lot on which the structure is located, etc.

In one embodiment, the system can also generate an investigation page that illustrates statistics relevant to an event investigation. The investigation page can include information regarding what was detected by each of the sensory nodes based on location of the sensory nodes. The detected information can be associated with a timestamp indicating the time that the detection was made. As an example, an entry for a first sensory node located in a kitchen 7:00 pm can indicate a detected smoke level at 7:00 pm, a detected temperature at 7:00 pm, a detected carbon monoxide level at 7:00 pm, a detected number of occupants at 7:00 pm, etc. Additional entries can be included for the first sensory node at subsequent times such as 7:01 pm, 7:02 pm, 7:03 pm, etc. until the evacuation condition is resolved or until the first sensory node is no longer functional. Similar entries can be included for each of the other nodes in the structure. The entries can also indicate the time at which the system determined that there is an evacuation condition, the time at which the system sends an alert to emergency responders and/or an emergency call center, the time at which emergency responders arrive at the scene, etc.

The investigation page may also include textual and/or visual indications of smoke levels, heat levels, carbon monoxide levels, occupancy, ambient light levels, etc. as a function of time. The investigation page can also include diagnostics information regarding each of the sensory nodes at the structure. The diagnostics information can include information regarding the battery status of the node, the smoke detector status of the node, the occupancy detector status of the node, the temperature sensor status of the node, the carbon monoxide detector status of the node, the ambient light detector status of the node, the communication signal strength of the node, the speaker status of the node, etc. The diagnostic information can also include an installation date of the system at the structure, a most recent date that maintenance was performed at the structure, a most recent date that a system check was performed, etc. The investigation page can also include a summary of the evacuation condition that may be entered by an event investigator.

In an illustrative embodiment, emergency response call centers can also access the system through a user interface. As indicated above, emergency response operators can add information through the user interface such that the information is accessible to the emergency responders. The information can be received through a 911 call from an occupant present at the location of the evacuation condition. The information may also be received from emergency responders at the location of the evacuation condition. In one embodiment, an audible, textual, and/or vibratory alarm can be triggered upon detection of an evacuation condition to alert an emergency response operator of the condition. In one embodiment, the alarm may continue until the emergency response operator acknowledges the evacuation condition.

In one embodiment, the system can also send a 'warning' alert to a user such as a home owner/business owner when an evacuation condition is detected at his/her structure. In an illustrative embodiment, the system can determine that there is an evacuation condition if a smoke level, heat level, carbon monoxide level, etc. exceeds a respective predetermined evacuation condition threshold. The predetermined evacuation condition thresholds can be set by the system or designated by the user, depending on the embodiment. The system may also be configured to send a 'watch' alert to a user if a smoke level, heat level, carbon monoxide level, occupancy level, etc. exceeds a respective predetermined watch threshold. The predetermined watch thresholds can be set by the system or designated by the user, depending on the embodiment. In an illustrative embodiment, the watch thresholds can be in between a normal/expected level and the predetermined evacuation condition threshold. As such, the watch thresholds can be used to provide an early warning to a user that there may be a problem. As an example, the watch threshold for heat in a master bedroom may be 150 degrees F. and the evacuation condition threshold for heat in the master bedroom may be 200 degrees F. As another example, the user may indicate that a detected occupancy which exceeds a watch threshold (e.g., 10 people, 15 people, etc.) should result in a watch alert being sent to the user. As such, the user can determine whether there is an unauthorized party at his/her home. The user can also set the watch threshold for occupancy to 1 person for periods of time when the user is on vacation. As such, the user can be alerted if anyone enters his/her home while he/she is on vacation. A watch alert can also be sent to the user if a power loss is detected at any of the nodes. Watch alerts can also be sent to the user if the system detects a problem with any node such as low battery, inadequate communication signal, malfunctioning speaker, malfunctioning sensor, etc.

In one embodiment, when the system sends an early warning watch alert to a user, the system can request a response from the user indicating whether the user is at the location and/or whether the user believes that the watch alert is a false alarm. If no response is received from the user or if the user indicates that the alert may not be a false alarm, the system can automatically increase the sensitivity of the system to help determine whether there is an evacuation condition. The watch alerts and warning alerts can be sent to the user in the form of a text message, voice message, telephone call, e-mail, etc. In an illustrative embodiment, watch alerts are not provided by the system to emergency responders or an emergency response call center.

In one embodiment, one or more of the sensory nodes in a structure can include a video camera that is configured to capture video of at least a portion of the structure. Any type of video camera known to those of skill in the art may be used. In one embodiment, the video captured by the video camera can be sent to a remote server and stored at the remote server. To reduce the memory requirements at the remote server, the remote server may be configured to automatically delete the stored video after a predetermined period of time such as one hour, twelve hours, twenty-four hours, one week, two weeks, etc. A user can log in to the remote server and view the video captured by any one of the sensory nodes. As such, when the user is away from home, the user can check the video on the remote server to help determine whether there is an evacuation condition. Also, when the user is on vacation or otherwise away from home for an extended period of time, the user can log in to the remote server to make sure that there are no unexpected occupants in the structure, that there are no unauthorized parties at the structure, etc. The stored video can also be accessible to emergency responders, emergency call center operators, event investigators, etc. In one embodiment, in the event of an evacuation condition, the video can be streamed in real-time and provided to emergency responders and/or emergency call center operators when they log in to the system and view details of the evacuation condition. As such, the emergency responders and/or emergency call center operators can see a live video feed of the evacuation condition. The live video feed can be used to help determine the appropriate amount of resources to dispatch, the locations of occupants, etc.

Figure 7:
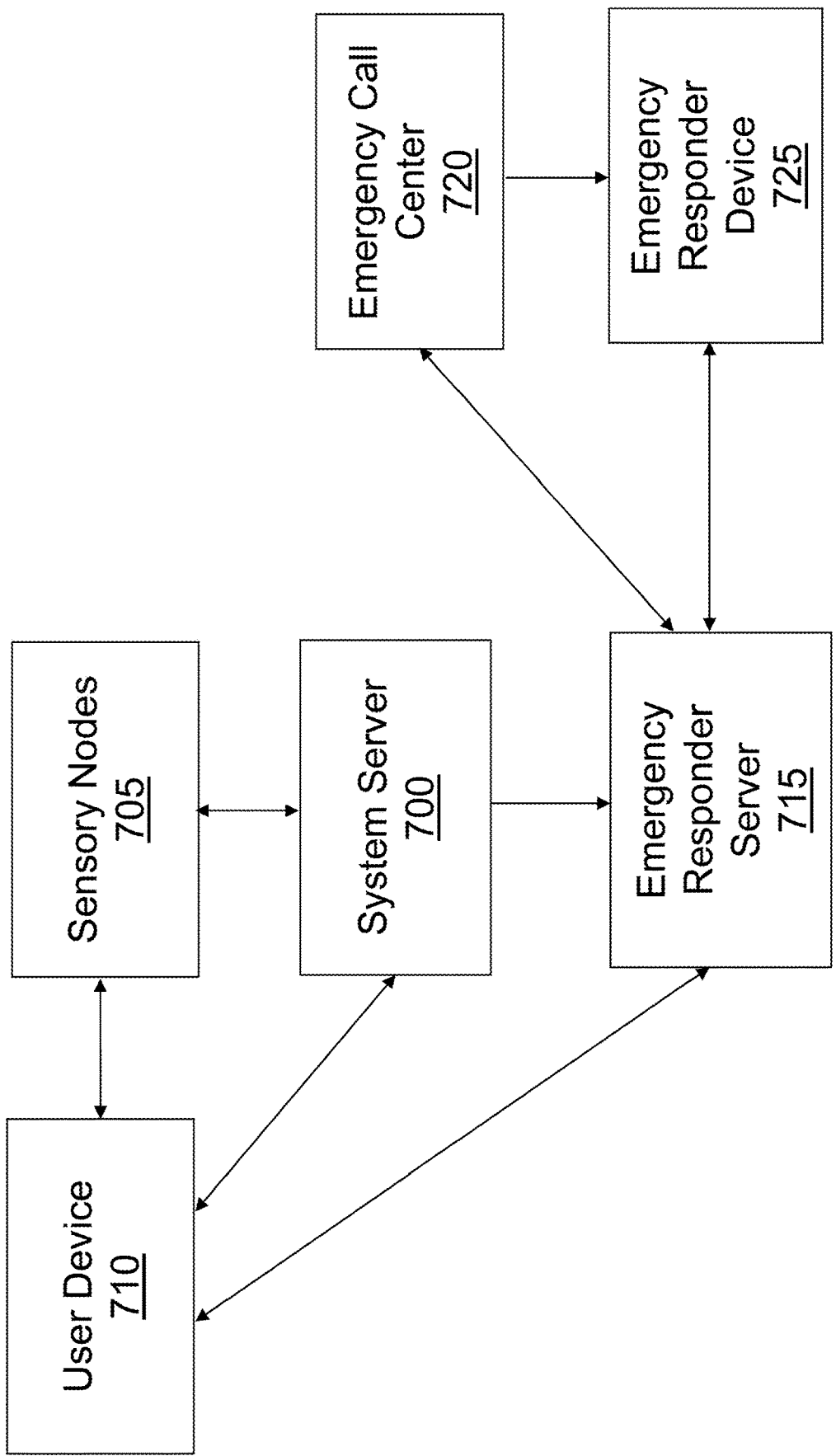
FIG. 7 is a block diagram illustrating communication between the system, emergency responders, a user, and an emergency response call center in accordance with an illustrative embodiment.

FIG. 7 is a block diagram illustrating communication between the system, emergency responders, a user, and an emergency response call center in accordance with an illustrative embodiment. Although not illustrated, it is to be understood that the communications may occur through a direct link or a network such as the Internet, cellular network, local area network, etc. Sensory nodes 705 in a structure can provide detected information, status information, etc. to a system server 700. The sensory nodes 705 can also receive instructions, evacuation routes, etc. from the system server 700. The sensory nodes 705 can also communicate with a user device 710 to provide alerts and receive acknowledgements and/or instructions regarding the alerts. In an alternative embodiment, communication of alerts and acknowledgements may be between the system server 700 and the user device 710. The user device 710 can also communicate with the sensory nodes 705 and/or system server 700 during installation and/or testing the system as described in more detail below. The user device 710 can be any device configured to convey information such as a smart phone, a smart watch, or an implantable device (such as computer chips implantable in humans).

Upon detection of an evacuation condition, the system server 700 or the user device 710 can provide information regarding the evacuation condition and/or structure to an emergency responder server 715. In one embodiment, the emergency responder server 715 can generate a record of the evacuation condition and provide the record to an emergency call center 720. The emergency responder server 715 may also receive information from the emergency call center 720 such as login information, additional information regarding the evacuation condition received during a 911 call, etc. In one embodiment, the emergency responder server 715 or an operator at the emergency response call center can initiate contact with the first responders through a telephone call, etc. to an emergency responder center. Upon receiving notice of the evacuation condition, an emergency responder can use an emergency responder device 725 to log in to the system. The login information can be communicated from the emergency responder device 725 to the emergency responder server 715. The emergency responder device 725 can receive the evacuation condition record and utilize the information to prepare for responding to the evacuation condition and to ensure that sufficient resources are dedicated to the evacuation condition.

In an embodiment, the user device 710 can be configured to provide information to emergency responders. Conveyance of such information to the responders can be via the emergency responder server 715 or can be more direct. For example, user device 710 can be configured to transmit information related to a location of user device 710 to the system server 700, which can, in turn, convey the information to a device of the emergency responders. In another example, user device 710 can be configured to detect, via wireless communication networks or direct wireless connections (e.g., Bluetooth), an emergency responder device. In such an example, the user device 710 can communicate with the emergency responder device using the applicable communication medium.

In some embodiments, the user device 710 can be configured to send to the emergency responders information including a location of the user device, a floor plan of the building, other building information, evacuation condition information, or any other information accessible to the user device 710. The user device 710 can also be configured to transmit user input information to the emergency responders. For example, the user device 710 can be configured to send an audio message, a video, text, or other information to the emergency responders. In such an example, the user device 710 can record an audio message of a voice saying, "Please help me. I'm in the master bedroom and I cannot get out." The user device 710 can then send the audio message to the emergency responders. In some embodiments, the user device 710 can detect a location of the user device 710, and send the location information to the emergency responders. In some embodiments, user device 710 can make a determination about a user and send the determination to the emergency responders. For example, the user device 710 can determine that the user is moving along an evacuation route. In such an instance, the user device 710 can send information to the emergency responders indicating that the user does not need emergency assistance. In another example, the user device 710 can determine that the user has not responded to a notification by the user device 710 and send information to the emergency responders indicating that the user may be incapacitated. In yet another example, the user device 710 can detect audio (or any other detectable sense such as motion) that indicates that a person is in need of assistance (e.g., screaming, certain words like "help," loud noises, crashes, falls, etc.) and communicate the relevant information to the emergency responders. The relevant information can include a location of the user device 710, an audio file, a movement speed of the user device 710, or past movements (e.g., a 10 ft. fall).

In an illustrative embodiment, sensory nodes 705 can provide detected information, status information, etc. to the user device 710. User device 710 can, based at least in part on the information provided by the sensory nodes 705, determine that there is an evacuation condition. In such an embodiment, the user device 710 can provide the information regarding the evacuation condition to the emergency responder server 715. Thus, the system server 700 need not receive the information regarding the evacuation condition before the emergency responder server 715 is notified.

In an illustrative embodiment, the user device 710 can be a smart phone. The user device 710 can, for example, receive information from a sensory node 705 that a master bedroom temperature is 200 degrees F. The user device 710 can determine that 200 degrees F. is higher than an evacuation condition threshold and, therefore, that an evacuation condition exists. The user device 710 can notify a user by any means known to those of skill in the art, for example ringing, flashing, vibrating, text message, etc. For example, the user device 710 can indicate via text that "The master bedroom temperature exceeds 200 degrees F. A fire is expected." The user device 710 can further prompt the user for an action such as acknowledging the alarm, indicating that the alarm is a false alarm, or contacting emergency personnel. For example, the user device 710 can prompt a user to contact 911 personnel. In such an example, the user device 710 can be configured to allow acknowledgement of the prompt via any available input. In one example, the user can verbally confirm that the user device 710 should call 911. In one embodiment, contacting emergency personnel can include sending information related to the evacuation condition to emergency responder server 715. In another embodiment, contacting emergency personnel can include contacting the emergency personnel via a telephone connection, for example by calling the fire department or 911. User device 710 can be configured to send all relevant information to the emergency personnel including sensory information, floor plan, occupancy, video (real-time or recorded), neighborhood information, real-time data, etc. In one embodiment, user device 710 can include a camera and can be configured to send to the emergency personnel pictures or video taken by a camera of the user device 710.

In some embodiments, a user can subscribe to a call center 720 that can monitor the status of sensory nodes 705. For example, a sensory node 705 can detect occupancy in a house above a threshold number of individuals (e.g., 0, 1, 2, etc.) and send the information to system server 700. System server 700 can then, in turn, send the information to the call center 720. An operator of call center 720 can access the information and determine how to respond. In some embodiments, an operator is not used and the call center 720 can be automated. In response to the information that occupancy in the house is higher than the threshold, the call center 720 can notify the user, such as with user device 710, or can contact an emergency responder, such as the police department. In some embodiments, the call center 720 can first contact the user via user device 710 and receive instructions on how to respond.

For example, the call center 720 can notify the user via user device 720 that occupancy in the house is above a threshold. The user can be notified that there are 20 people in the user's house. The user can then determine how the occupancy situation should be handled. For example, the user can determine that the call center 720 should ignore the alert because the user is hosting the 20 people. Alternatively, the user can decide that the call center 720 should contact the police because nobody should be at the user's house at that time. In other scenarios, the user can decide that call center 720 should contact a private security guard to take care of the occupancy situation, for example by breaking up an unauthorized house party. The user can use user device 710 to notify the call center 720 of the appropriate response using any method known in the art, including via telephone, text message, smart phone application, email, etc.

In an illustrative embodiment, user device 710 can receive information from emergency responder server 715. Such information can include, for example, instructions on performing emergency medical care, directions to the nearest fire extinguisher, location of en route emergency responders, etc. In some embodiments, user device 710 can already have useful information stored on it and can provide the information to the user. For example, user device 710 can include a floor plan that indicates the location of all defibrillators in the building. In an emergency where a defibrillator is needed, user device 710 can determine the location of the user device 710, and identify the nearest defibrillator. User device 710 can indicate to the user where the nearest defibrillator is and directions to locate the defibrillator. User device 710 can also remember the starting location of the user device, or the location of the emergency, and provide directions to return to the emergency once the defibrillator is located. User device 710 can further provide instructions on how to use the defibrillator. In alternative embodiments, emergency responder server 715 can provide such information to the user device 710. In such an embodiment, such information can be provided to the user device 710 once an emergency responder determines that the user requires the information.

The evacuation condition record provided to the emergency responder device 725 from the emergency responder server 715 can include any of the information discussed above, including maps, pictures, occupancy information, statistics regarding the evacuation condition, etc. In an alternative embodiment, the emergency responder server 715 may not be used. In such an embodiment, the system server 700 can be used to communicate with the emergency call center 720 and the emergency responder device 725.

In an illustrative embodiment, the system server 700 and/or sensory nodes 705 can communicate with the user device 710 during setup, installation, and/or testing of the system, and also to provide warning and watch alerts as described above. The user device can be a laptop computer, cellular telephone, smart phone, desktop computer, or any other computing device known to those of skill in the art. In one embodiment, the user device 710 can be used to access a user interface such that a user can access the system. The user interface can allow the user to set system preferences, provide occupancy information, provide vehicle information, upload pictures of the structure, provide construction information regarding the structure, provide lot information, provide information regarding the density of the surrounding neighborhood, etc. The user interface can also be used by the user to select and configure a service plan associated with the system and pay bills for the service plan.

In an illustrative embodiment, sensory nodes 705 can have an identification code associated with each sensory nodes 705. The identification code can be located on the sensory nodes 705, for example on an exterior housing or inside the housing. Alternatively, the identification code can be located on materials provided with the sensory nodes 705, for example on a packaging or box of the sensory nodes 705, on a card provided inside the packaging, or on a user manual. The identification code can identify the various sensory nodes 705 and be used to distinguish them from each other. Thus, during installation and/or setup of each sensory node 705, information can be provided to system server 700 to further identify each sensory node 705. The additional information can include location information such as geographical coordinates or room location (e.g. master bedroom), sensory node model/type information, last test date, etc. For example, a first sensory node can be a smoke detector with an identification code X. If the first sensory node detects smoke, the first sensory node can notify the system server 700 of the detected smoke. The notification can include the identification code X. The system server 700 can use the identification code X to provide detailed information to emergency personnel. For example, emergency personnel can be notified that smoke has been detected in the master bedroom and that the first sensory node has alarmed three times in the last month, which were all false alarms.

In another illustrative embodiment, identification codes can be used with the sensory nodes 705 to indicate which user the sensory nodes 705 are associated with. For example, sensory nodes 705 can communicate to user device 710 and system server 700 via, at least in part, a wireless communication. In such an example, sensory nodes 705 in Building A can be in communication range of sensory nodes 705, user device 710, or system server 700 of Building B. When Building A's sensory nodes 705 notify Building A's system of, for example, an evacuation event, identification codes can be used to identify sensory nodes 705 as part of Building A's system. Thus, Building B's system can ignore data transmitted from sensory nodes 705 associated with Building A. In alternative embodiments, data received by Building B's system regarding Building A's system can be forwarded by Building B's system to Building A's system. In other embodiments, data received by Building B's system regarding Building A's system can be forwarded by Building B's system to Building A's system only if the data received is identified as being important, urgent, etc.

The user interface accessible through the user device 710 can allow the user to record personalized evacuation route messages and/or personalized messages for dealing with mass notifications received by the system, and designate which sensory node(s) are used to convey the personalized messages. The user can also select how alerts/notifications are provided to the user, such as phone calls, text messages, e-mails, etc. The user can individually control the volume of each node through the user interface. The user can indicate the name of the room where each sensory node is located such that the room name is associated with the node (e.g., kitchen, living room, master bedroom, garage, etc.). The user can also temporarily decrease node sensitivity based on planned family events such as parties, seasonal canning (which results in high heat), card games in which guests are smoking, etc. In one embodiment, the user can use the user interface to designate the sensitivity level for each of the detectors included in each of the sensory nodes. In another embodiment, the user can also set threshold levels for heat, smoke, and/or carbon monoxide to dictate what constitutes an evacuation condition and/or a watch (or early warning) condition as discussed above.

In some embodiments, the user device 710 can allow a user to make personalized notifications. For example, user device 710 can receive text input from a user, audio (e.g., voice) input from a user, and/or video input from a user. The user device 710 can communicate with the system server 700 to allow the input from the user via the user device 710 to alert occupants if an evacuation event is detected. For example, user device 710 can be configured to receive an audio signal of a voice saying "The kitchen is on fire, please exit through the front door." Such audio information can be received by the system service 700 and stored. If there is a suspected fire in the kitchen, an occupant in the master bedroom can be alerted to the fire via a playback of the audio input, i.e. "The kitchen is on fire, please exit through the front door."

In some embodiments, the user device 710 can inform the user of an evacuation event. For example, a first user device 710 can receive text input from a user, audio (e.g., voice) input from a user, and/or video input from a user. The first user device 710 can receive information regarding a second user device 710 to alert if there is an evacuation event detected. In some embodiments, all user devices 710 that can communicate with system server 700 or sensory nodes 705 can be configured to alert users of an evacuation event. For example, a first user device 710 can receive an audio input of a voice saying, "Bobby, get up. Please exit the house through the garage door." Such audio, which can be a prerecorded message from a parent or relative, can be stored in the system server 700. In some embodiments, such audio can be stored at a second user device 710. The second user device 710 can be, for example, a smartphone assigned to Bobby. If there is an evacuation event, the second user device 710 can play back the recorded audio to alert users of an evacuation event. The alert by the user device 710 can be customized to indicate an evacuation route, a type of emergency, a style of alert (for example, a first alert style can be recorded for a time when a user is probably sleeping, and a second alert style can be recorded for a time when the user is probably awake), or any other optional variation on how an alert should be indicated, or what should be indicated. In some embodiments, the type of alert style can depend on the location of the second user device 710. For example, a first alert can be given if the user device 710 is in a bedroom (indicating that the user may be asleep) and a second alert can be given if the user device 710 is in the kitchen (indicating that the user may be awake).

In some embodiments, the user device 710 can alert the user to an evacuation condition only if the user device 710 is within an area affected by an evacuation condition. An affected area can be determined based on the location of the evacuation condition and the type of evacuation condition. In some embodiments, the affected area can be particular rooms of a building or particular buildings. In other embodiments, the affected area can be determined to be a distance away from the evacuation condition (e.g., a particular radius from a fire or hazardous fumes). User devices 710 to be alerted to the evacuation condition can be determined based on the location of the user device 710 in relation to the affected area. In one embodiment, user devices 710 within the affected area are alerted to the evacuation condition. In another embodiment, user devices 710 that are within a threshold distance from the affected area (e.g., 1000 feet) are alerted to the evacuation condition. For example, a smoke detector can detect smoke from the oven of a kitchen in a house and users in the kitchen and the surrounding rooms can be alerted. In another example, a kitchen fire in a house can be detected and users in the house can be alerted. In yet another example, a kitchen fire in a house can be detected and users in the house and users in surrounding houses can be alerted.

In one example, a user can live in a primary house that has a system in accordance with the present disclosure. The user, however, can stay a night at a different house, for example, at a sleep-over. In such an embodiment, if there is an evacuation condition (or other condition that provides an alert, e.g., a smoke detector) at the primary house and the user device 710 is located at the different house, the user device 710 of the user will not alert the user to the evacuation condition in the primary house. In another example, a university campus can be configured to use a system in accordance with the present disclosure. In such an example, if there is an evacuation condition in Dorm A, only user devices 710 within Dorm A are alerted to the evacuation condition, and user devices 710 that are not within Dorm A (e.g., other dorms, classrooms, etc.) do not alert the user. In the example, user devices 710 that are near Dorm A (e.g., on a sidewalk in front of Dorm A) are alerted. In another, similar example, if there is an evacuation condition in Dorm A that affects other buildings (e.g., a fire or an explosion), user devices 710 in all affected buildings can receive an alert.

In one embodiment, user devices 710 can receive information related to the evacuation condition, and each user device 710 can determine whether the user should be alerted. In another embodiment, user devices 710 can periodically (or constantly) send location information to system server 700 or sensory nodes 705. In such an embodiment, the system can determine which user devices 710 should receive the alert. In yet another embodiment, system 700 can send an alert via a portion of sensory nodes 705. The portion of sensory nodes 705 can be determined to be within an area affected by an evacuation condition. The portion of sensory nodes 705 can send out an alert to user devices 710 that are within communication range of the sensory nodes 705. Location of the user device 710 can be determined using any method described herein, e.g., GPS, Wi-Fi, etc.

In some embodiments, the user device 710 can alert the user to an evacuation condition. In such embodiments, the user device 710 can use a user display, a light (e.g., the flash light of a camera on a mobile device), audio, vibration, or any other technique known in the art. In some embodiments, the user device 710 can have an application that can receive information from system server 700 or the sensory nodes 705 that indicates that an evacuation condition has been detected. The application can configure the user device 710 to alert the user. For example, the application can set (i.e., override) a volume level to the maximum level. In such an example, the application can have the authority to override user settings to set the volume level to the maximum level. The application can also set other settings, such as a screen brightness, a light brightness, a vibration intenseness, etc. In some embodiments, the application can override operating system alerts and/or notifications. For example, if a brightness level of a screen is set to 50% because of an indication of a low battery, the application can ignore the indication of a low battery and set the screen brightness to 100%. In another example, the application can ignore other events that would normally alert the user. For example, if the user device 710 received an indication that there was a fire, the user device 710 can alert the user of the fire, and not notify the user of new emails, text messages, etc. In another example, the application can turn features of the user device 710 on and off. In some instances, the application can turn off features to conserve the battery of the user device 710. In other instances, the user device 710 can turn on features that better enable the user device 710 to gather information. For example, the application can turn on a Wi-Fi capability of the user device 710. A Wi-Fi capability can include a wireless capability consistent with the Institute of Electrical and Electronics Engineers' (IEEE) 802.11 standards. Turning on the Wi-Fi can be to receive more information regarding an evacuation condition or an evacuation route. Turning on the Wi-Fi can also be to enable better location determination. For example, in some instances, a location of the user device 710 can be improved by using Wi-Fi rather than traditional methods of locating the user device 710 (e.g., GPS, cellular telephone tower triangulation, etc.). In some embodiments, the application can be configured to turn on a 3G service, a 4G service, an SMS service, etc. In other embodiments, the application can be configured to automatically receive information from an available source (3G, 4G, Wi-Fi, the best Wi-Fi connection, etc.)

In an embodiment, the user device 710 can be configured to enable system 700, sensory nodes 705, or other devices (such as emergency responder devices) to determine a location of the user device 710. For example, user device 710 can send out a beacon signal that can be detected by system 700, sensory nodes 705, or other devices to determine a location of the user device 710. User device 710 can also be a passive communication device, using technologies such as near field communication (NFC). Such devices can include a smart phone, a smart watch, or implantable chips. In one embodiment, a device of an emergency responder can scan a location (or otherwise detect passive communications) to determine if a user device 710 is within the location. For example, an emergency responder device can detect that a smart phone is within a bedroom. The information can then be used to determine that a user of the smartphone is within the bedroom. In another embodiment, the user device 710 can be an implantable chip within a human. A device of the emergency responder can detect the user device 710 and can identify a user of the user device 710 via the information conveyed by the user device 710 through the NFC. In yet other embodiments, user device 710 can be configured to detect information of other user devices 710. For example, a user following an evacuation route with a first user device 710 can pass a person with a second user device 710 and detect a location of the second user device 710. The first user device 710 can then transmit the location of the second user device 710 to system server 700, sensory nodes 705, or emergency responders.

In an illustrative embodiment, the user interface can include an application running on user device 710, which can be a smart phone. Such an application can include an interface for a user to include information about the system in general, or about particular aspects of the system. For example, the application can provide a user interface to allow a user to enter information regarding a floor plan of the building, a map or layout of the neighborhood, building information such as materials of construction, an elevation drawing, window location, etc. In another example, the application can provide a user interface to allow a user to enter information regarding particular sensory nodes 705. Such information can include location of the sensory node with respect to the building, location of the sensory node with respect to a particular room, a picture of the room and/or sensory node, etc.

In some embodiments, the user interface accessible through the user device 710 can indicate an evacuation route to a user. The evacuation route can be based on the location of the user device 710. The evacuation route can also be based on the type or location of the evacuation event. The evacuation route can be determined by the system server 700, one or more sensory nodes 705, or one or more user devices 710. For example, the user device 710 can receive a map of a building that the user device 710 is in. In some embodiments, the user device 710 can receive the building information as soon as the user device is in communication with system service 700 or sensory nodes 705. In some embodiments, the user can selectively receive the building information. In such embodiments, the user can, for example, request building information from the system 700 or sensory nodes 705. In other embodiments, the system 700 or the sensory nodes 705 can query the user device 710 (or the user) to determine if the user device will receive the building information. In yet other embodiments, building information can be received by the user device 710 automatically. In some embodiments, the user device 710 will receive building information only if there is an evacuation event detected. The user device 710 can be configured to receive information via Wi-Fi, 3G, 4G, SMS, etc.

In some embodiments, the user device 710 can receive information regarding the evacuation condition and information relevant to determining an evacuation route. Such information can include location of other occupants, a type of evacuation condition (e.g., fire, flood, smoke, etc.), location of exits, blocked pathways, location of user device 710, etc. The user device 710 can then use the information regarding the evacuation condition to determine an evacuation route. The user device 710 can also determine the evacuation route based on information from the user device 710. For example, the user device 710 can recognize that the user of the user device 710 is handicapped and cannot climb down stairs. In such an example, the user device 710 can determine an evacuation route that is wheelchair accessible but still allows the user to travel to safety.

In some embodiments, the user device 710 can modify the evacuation route based on information received or determined after an initial evacuation route has been determined. For example, an initial evacuation route can indicate that a user should walk down a hallway. The user device 710 can track the movement of the user device 710 (and, therefore, the user) indicating that the user device 710 is moving down the hallway. The user device 710 can also determine that the user device 710 has begun to move in a direction opposite to the path indicated by the evacuation route. This could be because the evacuation condition has made the hallway an unsafe route, and the user recognized such and began to retreat. In such an instance, the user device 710 (or system server 700) can determine a new evacuation route that avoids the hallway that was previously used in the evacuation route. In another example, the user device 710 can initially receive information indicating that exiting via the west wing of a building is safe and efficient. The user device 710 can then receive information indicating that the west wing is no longer a safe route because, for example, a fire has spread to the west wing. In such a case, the user device 710 (or system server 700) can determine a new evacuation route that avoids the west wing.

In an illustrative embodiment, the user device 710 can be configured to display an evacuation route to a user using turn by turn instructions. In such an embodiment, the user device 710 can have building information including a floor plan stored thereon. The user device 710 can then receive or determine an evacuation route that navigates through the floor plan. The user device 710 can monitor the location of the user device 710, and give turn-by-turn instructions based on the evacuation route, the floor plan, and the current location of the user device 710. The turn-by-turn instructions can be delivered via any method known in the art including audio (e.g., voice) and graphical.

In another illustrative embodiment, the application can be used during installation of the system. As discussed above, sensory nodes 705 can be associated with an identification code. The application can be used to read or identify the identification code. The identification code can be identified by reading a bar code, a quick response code (QR code), near field communication (NFC), radio frequency identification (RFID), etc. When the sensory node 705 is placed in commission, the application can identify the sensory node 705 by the identification code and communicate that information to the system server 700. The application can be used to gather and communicate other information such as a location, a picture, etc. For example, if sensory node 705 is a smoke detector on the ceiling of a bathroom, user device 710 can be placed near the sensory node 705 to read the identification code. Once user device 710 reads the identification code, the user device can also capture location information, such as coordinates or room information. Thus, user device 710 can communicate to system server 700 that sensory node 705 with identification code X is located in the bathroom at coordinates Y at an elevation of Z. The application can identify settings of sensory node 705 and communicate that information to system server 700. In one embodiment, settings information can be captured by user device 710 via wireless communication. In another embodiment, settings information can include dip switch settings, electrical jumper locations, or other physical settings. In such an embodiment, user device 710 can be used to capture an image of the physical settings, and send the image to system server 700. Thus, if sensory node 705 needs to be replaced, system server 700 can provide information on how the new sensory node 705 should be configured.

The user can also access system integrity and status information through the user interface. The system integrity and status information can include present battery levels, historic battery levels, estimated battery life, estimated sensor life for any of the sensors in any of the sensory nodes, current and historic AC power levels, current and historic communication signal strengths for the sensory nodes, current and historic sensitivity levels of the sensory nodes, the date of system installation, the dates when any system maintenance has been performed and/or the type of maintenance performed, etc. The system information accessible through the user interface can further include current and historic levels of smoke, heat, carbon monoxide, ambient light, occupancy, etc. detected by each of the sensory nodes.

The system can also provide the user with weekly, monthly, yearly, etc. diagnostic reports regarding system status. The reports may also be provided to emergency response departments such as a fire department and an insurance provider that insure the user's home. The system can also send reminders to the user to perform periodic tests and/or simulations to help ensure that the system is functional and that the user stays familiar with how the system operates. In one embodiment, users may receive an insurance discount from their insurance provider only if they run the periodic tests and/or simulations of the system. The system can also send periodic requests asking the user to provide any changes to the information provided during installation. Examples of information that may change can include an addition to the structure, additional occupants living at the structure, a new pet, the death of a pet, fewer occupants living at the structure, a change in construction materials of the structure such as a new type of roof, new flooring, etc.

In an illustrative embodiment, the user can develop and run emergency test scenarios through the user interface to test the system and help ensure that the user understands how the system operates. As an example, the user may simulate an evacuation condition of a fire. As such, the system can provide evacuation routes, play pre-recorded messages, sound an alarm, send a warning alert to the user, etc. such that the user and others in the structure can perform a fire drill. In addition to practicing the fire drill, the user can verify that room locations associated with the sensors are accurate, the desired volume levels of the sensors are being used, that pre-recorded evacuation messages are correct, etc. As discussed above, in the event of an evacuation condition or mass notification message, the system can also be configured take different actions based on the time of day that the evacuation condition is detected or that the mass notification is received. The user can also simulate an evacuation condition for a specific time of day to ensure that the system operates as designated by the user for that specific time. The user can also simulate the system with respect to mass notifications that may be received and conveyed by the system such as weather alerts, school closings, etc.

In an illustrative embodiment, evacuation simulations can be controlled by the system server 700. Alternatively, a separate emergency simulator server may be used. In one embodiment, the simulation of an evacuation condition may be performed in conjunction with the emergency responder server 715 and/or the emergency call center 720 to ensure that the system properly provides the authorities with a notification of the evacuation condition. In such an embodiment, the notification provided to the emergency responder server 715 and/or the emergency call center 720 can be designated as a 'test' notification or similar to ensure that the emergency responders know that there is not an actual evacuation condition.

Although not illustrated in FIG. 7, it is to be understood that the communications may occur through a direct link or a network such as the Internet, cellular network, local area network (LAN), etc. Sensory nodes 705 can communicate with user device 710 via a low energy or ultra-low energy wireless communication, such as Bluetooth Low Energy (BLE). In some embodiments, the user device 710 does not have to be in constant communication range of sensory nodes 705. Sensory nodes 705 can internally store data acquired while user device 710 is not within communication range. Once user device 710 is within communication range, sensory nodes 705 can communicate the data to user device 710. In some embodiments, sensory nodes 705 can communicate with a storage device (not shown in FIG. 7) that is constantly in communication range of sensory nodes 705. Thus, sensory nodes 705 can store data in the storage device when the user device 710 is not within communication range. In some embodiments, sensory nodes 705 communicate exclusively with the storage device. The storage device can communicate the data to user device 710 when the user device 710 is within communication range of the storage device. In such an embodiment, the storage device and/or system server 700 may not be directly connected to a network for remote communication. The data that is provided to user device 710 can include any data acquired by sensory nodes 705, energy usage data within the building, and/or data from sensors placed in the building such as rain sensors, wind sensors, flood sensors, hail sensors, etc.

User device 710 can communicate with system server 700 via any wireless communication protocol known to those skilled in the art. For example, user device 710 can communicate with system server 700 using BLE, wireless LAN, or a cellular network. User device 710 can communicate data received from sensory nodes 705 to system server 700. For example, sensory nodes 705 can be located in a house of a user. User device 710 can be a smart phone. Thus, when the user goes to work for the day and brings user device 710 along, user device 710 is out of communication range of sensory nodes 705. All data acquired by sensory nodes 705 while the user is at work is stored by the sensory nodes 705. When the user returns to the house from work, with user device 710, sensory nodes 705 can communicate the data to the user device 710 which can, in turn, communicate the data to system server 700 and/or any other external system such as emergency responder server 715.

Figure 8:
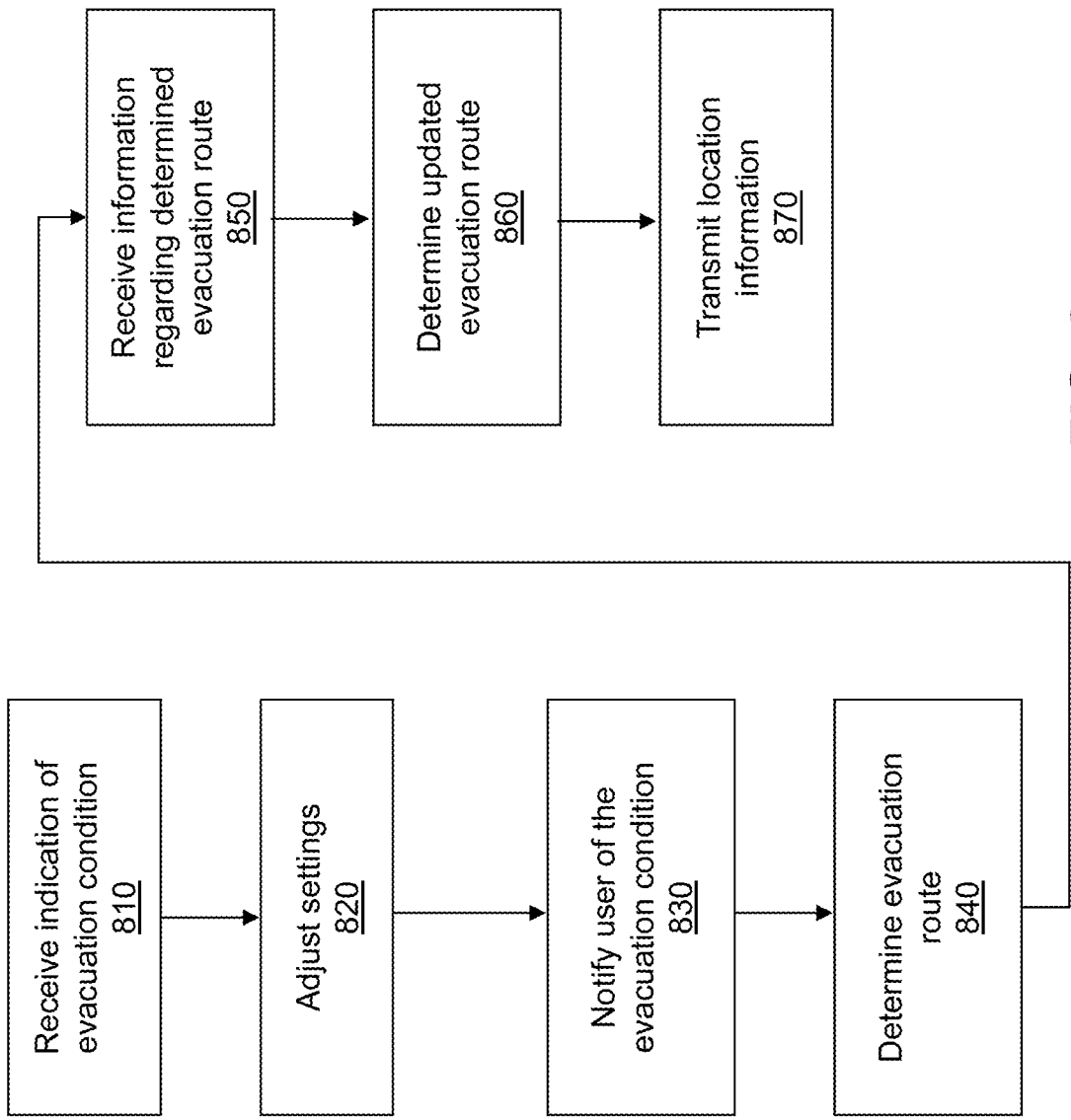
FIG. 8 is a flow diagram illustrating operations performed by a user device in accordance with an illustrative embodiment.

FIG. 8 is a flow diagram illustrating operations performed by a user device in accordance with an illustrative embodiment. In alternative embodiments, additional, fewer, and/or different operations may be performed. Further, the use of a flow diagram is not meant to be limiting with respect to the order of operations performed. Any of the operations described with reference to FIG. 8 can be performed by one or more sensory nodes, by one or more decision nodes, and/or by a system server. In an operation 810, an indication of an evacuation condition is received. The indication of the evacuation condition can be from the system server 700 or by one or more sensory nodes 705. In some embodiments, the indication of the evacuation condition can be received from a system for managing various aspects of a building. For example, hotels, stadiums, and office buildings (and various other types of buildings) can have a building management system. The various systems described in the present disclosure can be configured to access and/or share information with the systems already installed and configured in the building. For example, a building management system or building automated system can include a panel on a wall or a control center configured to allow a user to access and control various aspects of a building. Such aspects can include security cameras or video (including closed-circuit television (CCTV)), water management, smoke detectors, fire alarms, heating, ventilation, and air conditioner (HVAC) systems, mechanical systems, electrical systems, illumination systems, elevators, announcement systems, and plumbing systems. In some embodiments, the building management system can send an indication of the evacuation condition to the system server 700 or a sensory node 705, and the system server 700 or the sensory node 705 can process the indication of the evacuation condition as described in the present disclosure.

In some embodiments, the building management system can send an indication of the evacuation condition to the user device. The user device can have an application or other software installed on the user device to process the indication of the evacuation condition accordingly. For example, the user device can notify the user, prompt the user if emergency personnel should be contacted, and/or provide instructions on how to evacuate the building. In an embodiment that has a user device notifies the user of the evacuation condition, in an operation 820, user device settings can be adjusted. For example, a volume level of the user device can be increased. In an operation 830, the user device can notify the user of the evacuation condition. The notification can include a prompt for the user to allow the user device to contact emergency personnel (e.g., via 911). In an operation 840, the user device can determine an evacuation route. The user device can receive information (e.g., a floor plan) including information indicating navigable pathways. The user device can evaluate various possible navigable pathways and determine the best route to escape from the building. In some embodiments, the information received can include pathways that are determined to not be navigable. For example, a hallway can be determined to be not navigable because it is flooded. In some embodiments, the user device can receive the evacuation route from another system. The user device can display the evacuation route to the user (e.g., via turn-by-turn instructions, a map, etc.).

In an operation 850, the user device can receive information regarding the determined evacuation route. Such information can include information that indicates that the determined evacuation route is no longer recommended. For example, the user device can track the user device's location along the determined evacuation route. The user device can detect sounds indicating that the user device is headed for an unsafe environment (e.g., the roar of a fire is getting louder as the user device heads along the determined evacuation condition and toward the fire). In another example, the user device can determine that the user is not following the determined evacuation route. In some embodiments, the user device can receive information from a building management system, system server 700, and/or sensory nodes 705 that indicates that a portion of the building is not navigable. In an operation 860, the user device can determine an updated evacuation route based at least in part on the information received regarding the determined evacuation route. The updated evacuation route can be a route that avoids a portion of the building determined to not be navigable. The user device can display to the user the updated evacuation route.

In an operation 870, the user device can transmit location information. In some embodiments, the user device can transmit a beacon allowing another system (including other user devices) to determine the location of the user device. For example, an emergency personnel device can be used to scan a given location for the user device. In some embodiments, the user device can send information indicating the location of the user device to the system server 700, the sensory nodes 705, and/or emergency personnel via Wi-Fi, 3G, 4G, etc.

In an illustrative embodiment, any of the operations described herein can be implemented at least in part as computer-readable instructions stored on a computer-readable memory. Upon execution of the computer-readable instructions by a processor, the computer-readable instructions can cause a node to perform the operations.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. An evacuation system comprising:
   a plurality of sensory nodes installed within a structure, wherein each of the plurality of sensory nodes is configured to detect an evacuation condition;
   a system server in communication with the plurality of sensory nodes;
   a user device configured to communicate with the system server, the user device comprising a sensor which can determine a location of the user device, the user device receiving data that represents physical limitations of a user;

wherein the system server is configured to transmit the existence of the evacuation condition to the user device;

the user device being configured to alert a user of the evacuation condition; and wherein the user device communicates information related to the evacuation condition and an evacuation route to the user, the evacuation route determined at least in part using the physical limitations of the user; and wherein the user device prevents communication of the alert when the user device is located in an area not affected by detected evacuation condition.

2. The evacuation system of claim 1, wherein the system server is configured to determine a location of the evacuation condition based upon a location or identity of at least one of the plurality of sensory nodes that detect the evacuation condition and transmit the determined location to the user device.

3. The evacuation system of claim 1, wherein each of the plurality of sensory nodes comprises:
a sensor configured to detect the evacuation condition;
a memory configured to store identity information of each of the plurality of sensory nodes and routing information configured to facilitate communication with other ones of the plurality of sensory nodes and with the system server; and
a processor configured to:
transmit information of the evacuation condition to the system server based upon information received from the sensor and the memory.

4. The evacuation system of claim 3, wherein the identity information comprises at least one of global positioning coordinates or installation position with the structure.

5. The evacuation system of claim 1, wherein the user device is configured to utilize a number of occupants detected in combination with the severity of the evacuation condition and the layout of the structure to determine the evacuation route.

6. The evacuation system of claim 1, wherein the system server collects data from one or more of the sensory nodes comprising detected conditions and timestamps associated the detection conditions.

7. The evacuation system of claim 6, wherein the system server stores the collected data when not in communications range of the user device and communicates the stored data and timestamps to the user device when the user devices comes into communications range of the system server.

8. The evacuation system of claim 1, wherein the sensory nodes utilize a first threshold to detect an evacuation condition and a second threshold to provide an early warning of an impending evacuation condition and the system server further configured to transmit the early warning to a user device.

9. The evacuation system of claim 1, wherein the user device is in direct communication with an emergency responder and communicates a location of the user device and information pertaining to the structure to an emergency responder.

10. The evacuation system of claim 1, wherein the user device comprises a representation of a floor plan of the structure.

11. The evacuation system of claim 1, wherein the user device receives building conditions after the evacuation route is communicated to the user, the received building conditions being used to provide a modification to the evacuation route.

12. A method of evacuating a structure comprising:
receiving, by a system server, sensory data from a plurality of sensory nodes;
determining, by the system server, an evacuation condition using sensory data received from at least one of the plurality of sensory nodes;
communicating, by the system server, the existence of the evacuation condition to a user device;
receiving, by the user device, data representing physical limitations of a user of the user device;
displaying on a user interface of the user device, information about the evacuation condition;
determining, by the user device, a location of user device;
displaying on the user interface of the user device, an alert of the existence of the evacuation condition;
displaying on the user interface of the user device, an evacuation route where the evacuation route is determined at least in part using the physical limitations of the user;
storing the received sensory data when the system server is not in communications range of the user device; and
communicating the stored sensory data and data timestamps to the user device when the user devices comes into communications range of the system server.

13. The method of claim 12, further comprising:
receiving by a system server, sensory node information comprising at least one of global positioning coordinates or installation position with the structure.

14. The method of claim 13, wherein:
the system server:
determining, by the system server, a location of the evacuation condition based upon a location or identity of at least one of the plurality of sensory nodes that detect the evacuation condition; and
transmitting to the user device by the system server, the determined location.

15. The method of claim 12, further comprising:
determining an evacuation route utilizing a number of occupants detected in combination with the severity of the evacuation condition and the layout of the structure.

16. An evacuation system comprising:
a plurality of sensory nodes installed within a structure, wherein each of the plurality of sensory nodes is configured to detect an evacuation condition;
a system server in communication with the plurality of sensory nodes;
a user device configured to communicate with the system server, the user device comprising a sensor which can determine a location of the user device;
wherein the system server is configured to transmit the existence of the evacuation condition to the user device;
the user device is in direct communication with an emergency responder and configured to communicate a location of the user device and information pertaining to the structure to an emergency responder;
the user device being configured to alert a user of the evacuation condition;
wherein the user device receives data representing physical limitations of a user and determines an evacuation route based upon the physical limitations of the user and the evacuation condition;

wherein the user device communicates information related to the evacuation condition and the evacuation route to the user; and wherein the user device receives building conditions after the evacuation route is communicated to the user, the user device being configured to provide the user with a second evacuation route based on the received building conditions.

\* \* \* \* \*